United States Patent [19]

Bartlett et al.

[11] Patent Number: 4,608,664

[45] Date of Patent: Aug. 26, 1986

[54] AUTOMATICALLY BALANCING AND VERTICALLY JUSTIFYING A PLURALITY OF TEXT/GRAPHICS-COLUMNS

[75] Inventors: Geoffrey M. Bartlett, Ridgefield, Conn.; James P. Hofmeister, Tucson, Ariz.; Derald D. Nye, Tucson, Ariz.; Edward J. Pring, Tucson, Ariz.

[73] Assignee: International Business Machines Corporation, Armonk, N.Y.

[21] Appl. No.: 469,180

[22] Filed: Feb. 23, 1983

[51] Int. Cl.⁴ .................. G06F 3/12; G06F 15/626
[52] U.S. Cl. ................... 364/900; 400/76; 364/523; 354/7
[58] Field of Search ... 364/200 MS File, 900 MS File, 364/523; 400/279, 76, 63; 354/7, 8, 9; 340/731, 733, 734

[56] References Cited

U.S. PATENT DOCUMENTS 3,068,767 12/1962 Newton ........................ 354/9
3,810,197 5/1974 Piccone ........................ 354/9

OTHER PUBLICATIONS

IBM Technical Report, "Computer Controlled Page Layout", T. A. Gorney; Dec. 20, 1965, FIGS. 12, 13, on p. 11, TR00.1336-1 (Text 90).

Primary Examiner—James D. Thomas
Assistant Examiner—Thomas Lee
Attorney, Agent, or Firm—H. F. Somermeyer

[57] ABSTRACT

Text and graphics are justified along one physical dimension to a predetermined line of justification. A plurality of physical parameters are employed in the justification, each of the parameters is assigned a compression and an expansion adjustment ratio. Such ratios define the maximum adjustment range of each of the parameters. A priority of adjustment is assigned to each of the parameters such that one parameter being adjusted and capable of meeting justification needs is adjusted to the exclusion of all other possible parameter adjustments. In vertical justification of a plurality of columns, text distribution precedes the vertical adjustment. For such vertical justification, the priority of adjustment is based upon natural text/graphics breaks; top priority is use of lead outs, second is skips, third is spaces and last is textual adjustments. Justification is preferably proportional, i.e., the ratios are adjusted when the maximum permitted adjustment is not required for justification. For horizontal justification, similar ratio selections apply.

12 Claims, 21 Drawing Figures

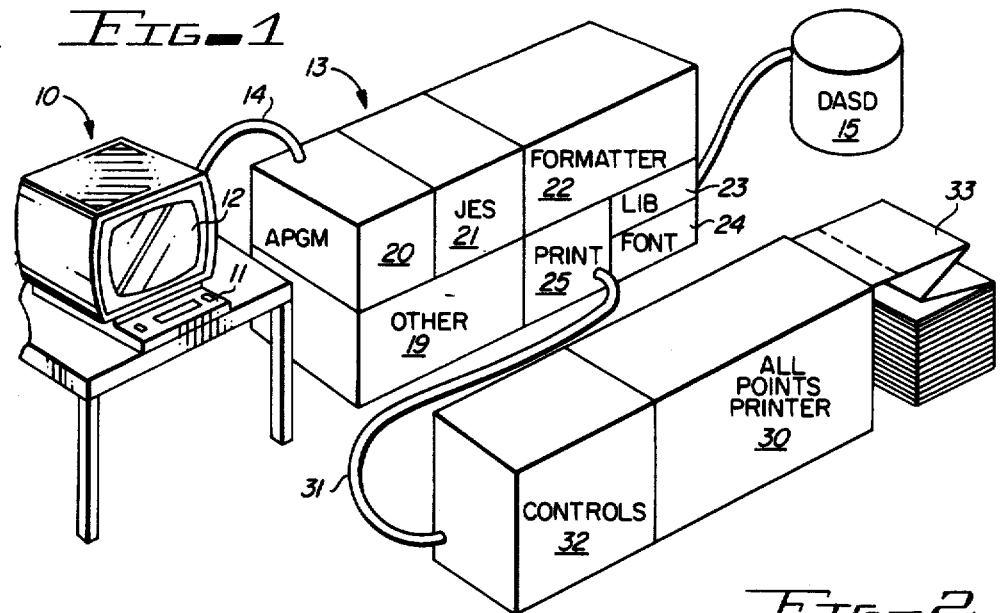
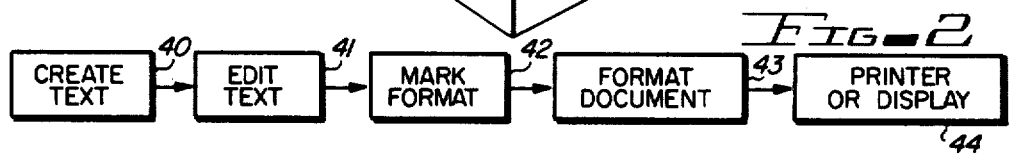
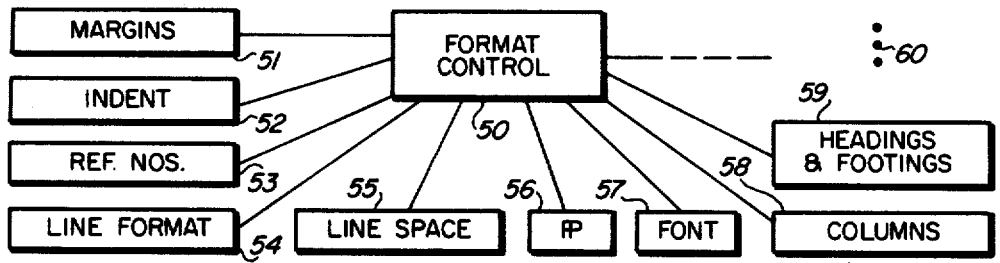
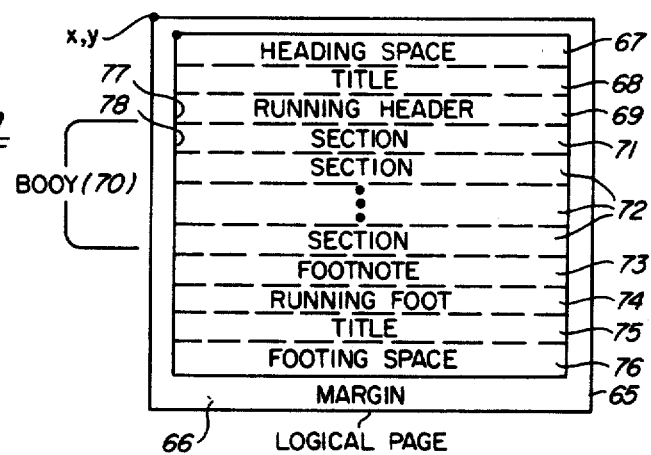

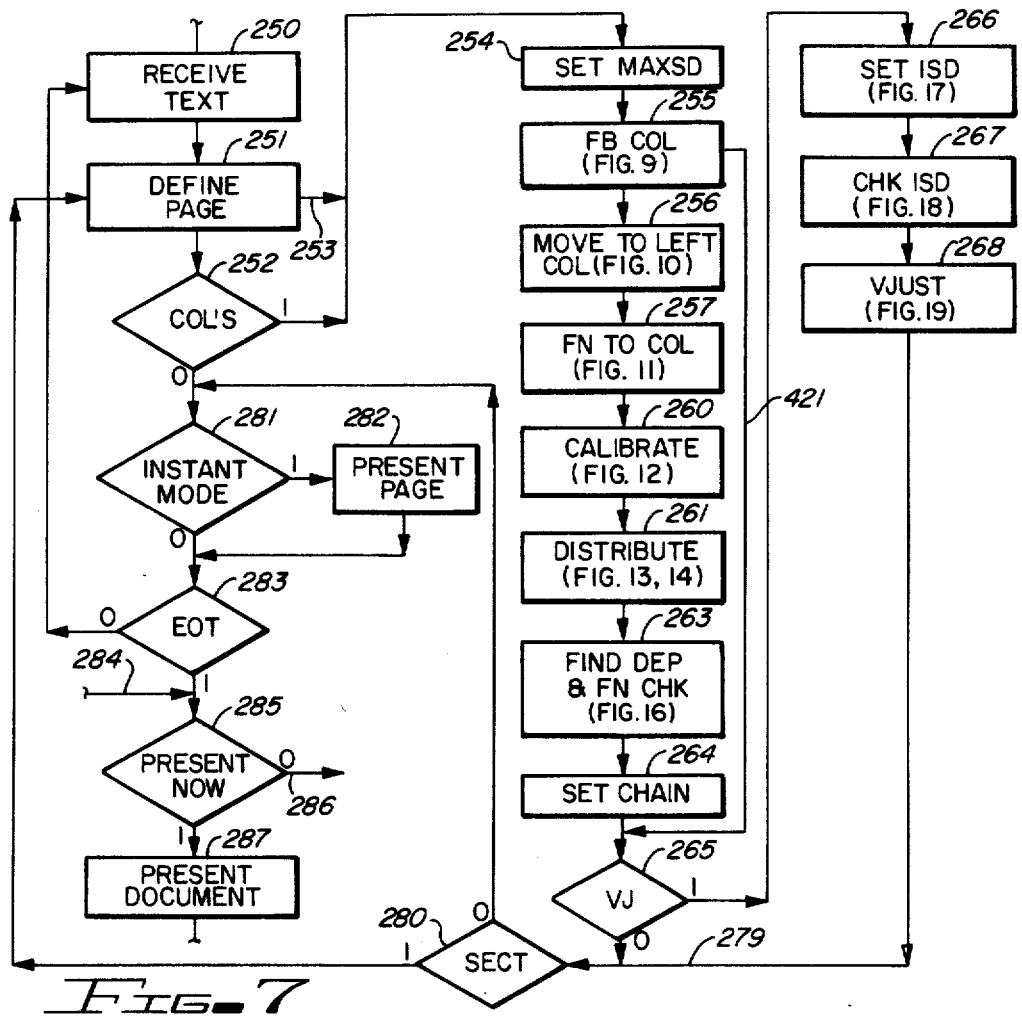
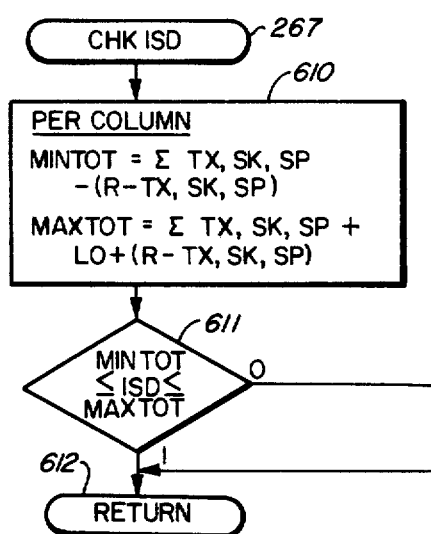
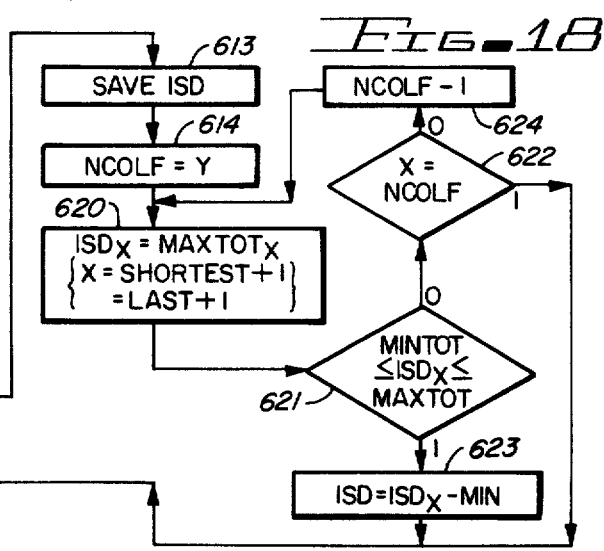

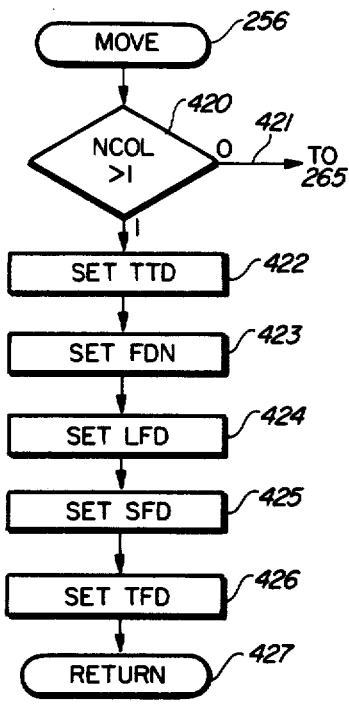
Fig-10
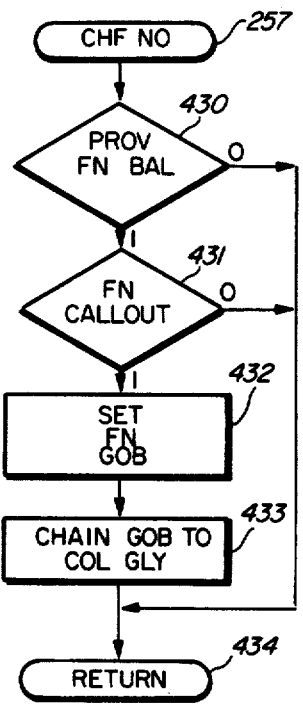
Fig-11
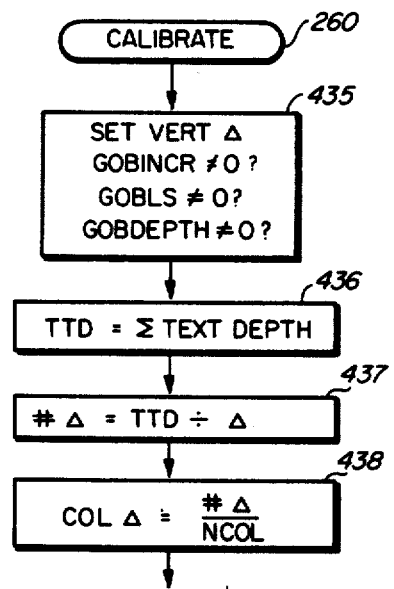
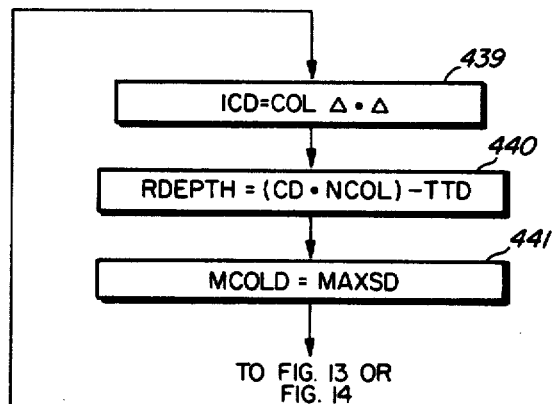
Fig-12

AUTOMATICALLY BALANCING AND VERTICALLY JUSTIFYING A PLURALITY OF TEXT/GRAPHICS-COLUMNS

FIELD OF THE INVENTION

The present invention relates to the typographic art and more particularly to automatically composing and formatting text and graphics in a plurality of text-containing columns on one or more pages of text and graphics.

BACKGROUND OF THE INVENTION

Printing and publishing, along with other forms of text and graphics presentation such as cathode ray tube displays and the like, have been accompanied by corresponding advances in the typographic art. This art is based upon the original typesetting art; it relates to the style, arrangement and appearance of so-called typeset matter. Typography not only includes the selection of text, it also relates to the arrangement of text and graphics in a particular presentation. Making such arrangements is often called composing and formatting.

A brief history of printing, typography and typesetting, including composition, is set forth in a book entitled *Pocket Pal*, of which the 12th edition was published in March, 1979 by the International Paper Company, 220 East 42nd St., New York, N.Y. 10017. Typography has evolved from hand typesetting to electronic photocomposers and printers. In these latter generations of machines, often referred to as the third generation of photocomposing, characters or symbols, as well as graphics, are formed by a series of minute dots or lines. The electronically-formed image, such as by a laser beam, is transferred to photographic material, to electrophotographic surface of an electrophotographic printer or other suitable image-forming surface. Such minute dots or lines are often formed as a raster or rectangular array of dots which are defined by digital signals; hence, this type of printing and typesetting is often referred to as digitized typesetting or printing. Such advanced machines allow the storage of text symbols and the control for using those symbols in electronic memories, such as found with high-speed electronic digital computers.

Even before the advent of all-electronic printers and typesetters, digital computers were used in the typographic art for providing formatted and composed text and graphics to earlier generation photocomposing machines. That is, a programmed digital computer received text and graphics data in the form of digital signals. These digital signals were manipulated in accordance with programs of the digital computer. The digital computer then provided the manipulated signals to the printer or photocomposer such that the latter elements visually presented the text and graphics data in accordance with computer program controlled composition and format parameters. Such automation of typography greatly relieves the burden on the typographer and hence provides a more efficient and versatile visual presentation that can be as aesthetically pleasing as hand-set type. An example of an early typographic composing computer program is TEXT-90, a computer program executed by the IBM 7090 digital computer system. The 7090 system was attached to a photocomposer which created the visual presentation of the text and graphics formatted by TEXT-90. TEXT-90, inter alia, manipulated the digital signals representing the text and graphics to build text lines and pages. Additionally, where text was to be presented in two side-by-side columns, such as found commonly in English language dictionaries and the like, the vertical depths of those columns were justified or balanced. This was achieved in TEXT-90 by always making the depth of a shorter one of the columns equal to the vertical depth of the longest column. That is, to achieve vertical justification, a column was always expanded. This action in text presentation resulted in a slight spatial increase between the successive lines of text when the shorter column was expanded to the longer column. Such expansion was also created by adding vertical "skips" between lines. The number and size of skips in a column were determined by the difference between the depth of the longer column and the depth of the shorter column. The skips, i.e. vertical background padding, were generated by scanning for headnotes (titles); additional blank for vertical space justification was preferably added at such headnotes. Following TEXT-90, more advanced typographic-related computer programs, including the PRINTEXT/370 and COMPOSITION/360 programs as well as Document Composition Facility (DCF), also included text page and column controls. The concept of a logical page was introduced. A set of digital signals provided a page definition which specified the dimensions of the page to be formatted. A column definition defined the number and width of columns and the space between the columns (gutters). A new page command caused subsequently received text representing digital signals to be formatted as a new page of text. In a similar manner, a new column command caused subsequently received text representing digital signals to be formatted in a new column. Programmed column processing specified whether the text was to be distributed among a plurality of columns and whether blank space was to be added in order to balance column lengths or depths. That is, vertical justification in COMPOSITION/360 was achieved by adding unprinted areas for lengthening a shorter column to the depth or length of a longer column. The programmed controls also permitted presenting text and graphics without vertical justification.

In the latter programs, column justification was a two-step process. A first step was to distribute text and graphics between the various columns within a specified number of columns to make the column depth as nearly equal as possible. Such balancing distribution was selectively initiated within the program by a suitable command from a user. The second step was a spacing step which determined whether or not additional blank or unprinted space was to be added to short columns to balance the depths of the columns. The spacing steps were performed with or without a preceding text distribution step. When column distribution was specified, the text and graphics were distributed amongst a plurality of columns. Column distribution was specified by a so-called "PAGE REG," "NEW PAGE," "PAGE DEFINITION" or "COLUMN DEFINITION" text control word being encountered or when the end of the document was defined. On pages having a plurality of columns, balancing was performed on all of the columns in a balanceable set after the distribution of the text or graphics had been performed. Under selective control, if the text and graphics were not distributed among the various columns, then the columns could be balanced to a maximum column depth (which might or might not be equal to the longest column of text, i.e. could be to a page length, for example). These programs distributed data among the various text columns in a single pass of programming execution.

With all of the above-described automatic typographic machine-implemented procedures, the quality of text and graphics presentation has continually been enhanced, such as described in the book *Phototypesetting: A Design Manual*, by James Craig, published by Watson-Guptill Publications, 1515 Broadway, New York, N.Y. 10036. Prior to the all-electronic printers, such as the electrophotographic printers, text was presented on a line-by-line basis; that is, a mechanism in the printer moved paper receiving the printed matter a distance equal to the center-to-center spacing of successive lines of text. The advent of the all-electronic printer did away with some constraints on the typographic art in that a page of data is represented by a rectangular array of print elements (PELs) which are individually addressable using digital computer addressing techniques. In other words, the all-electronic printer is programmed and controlled in the same way that a cathode ray tube is controlled for visually presenting text and graphics data. It is to this enhancement in document presentation that the present invention is most advantageously employed. The addressability of each print element of which a symbol in a given font may include a subraster array of 150 by 200 PELs, for example, enables expansion and compression of the text representing symbols as well as scanning all forms of graphics data. These enhancements create a demand for a more pleasing and aesthetic presentation of text in side-by-side column format. To this end, the present invention is directed to the automatic text and graphics composing and formatting of side-by-side columns which substantially enhance the visual presentation of text and graphics. All of this is achieved without operator intervention except for the supplying of formatting commands. Such enhancement obviates the need for operator selection on an interactive basis of column control, such as set forth in U.S. Pat. Nos. 3,952,852 and 4,207,011. This invention also enables the text and graphics composing and formatting at the print element, or PEL level, for all-points-addressable printers as well as to a line printer with programmed vertical formatting as set forth in U.S. Pat. No. 4,282,583.

SUMMARY OF THE INVENTION

According to the present invention, vertical justification of a plurality of justifiable text- and graphics-containing columns includes adjusting the various column depths in accordance with the difference between the column depths by compressing some columns and lengthening, or expanding, other columns to a common depth which is preferably intermediate to the depth of the longest and shortest columns. In a most preferred form, the intermediate depth is a minimal depth which enhances balancing the columns. Within the above justification, a range of line space adjustments for expansion and compression are set up. Such ranges include line-skip spaces, blank-line spaces, adjusting line spaces between adjacent or successive lines of text, adjusting a blank space at lead-out points and including setting a minimal line space increment so that line space precession between adjacent columns repeats within a given period of number of lines.

When compressing and expanding adjacent columns, columns will be expanded at the bottom of the columns and compressed at the top for maintaining a relative density horizontally across the plurality of columns being justified.

In another aspect of the invention, the method of adjusting the column lengths is dependent upon the length of a shortest one of the columns with respect to text distribution characteristics among the various columns. For a single-column page, the column is expanded to the bottom of the page using the method set forth above.

The foregoing and other objects, features, and advantages of the invention will be apparent from the following more particular description of the preferred embodiments of the invention, as illustrated in the accompanying drawings.

BRIEF DESCRIPTION OF THE DRAWINGS

FIG. 1 illustrates apparatus which advantageously employs the present invention.

FIG. 2 is a flow chart showing creation of a document using the FIG. 1 illustrated apparatus.

FIG. 3 is a functional block diagram of a formatter usable in the FIG. 1 illustrated apparatus.

FIG. 4 diagrammatically illustrates a logical page of text which is created using the FIG. 1 illustrated apparatus.

FIG. 7 is a broad machine operations chart illustrating operations of the FIG. 1 illustrated apparatus in implementing the present invention in a best mode.

FIGS. 9 through 14 and FIGS. 16 and 17 illustrate machine operations in detailed form for implementing the machine operations chart of FIG. 7.

FIG. 15 diagrammatically illustrates adjusting text within a logical page when employing vertical formatting of the present invention.

FIGS. 18 through 21 are detailed machine operations charts illustrating vertically justifying a plurality of columns subsequent to the distribution of text as referred to in FIG. 7.

DETAILED DESCRIPTION

Figure 5:
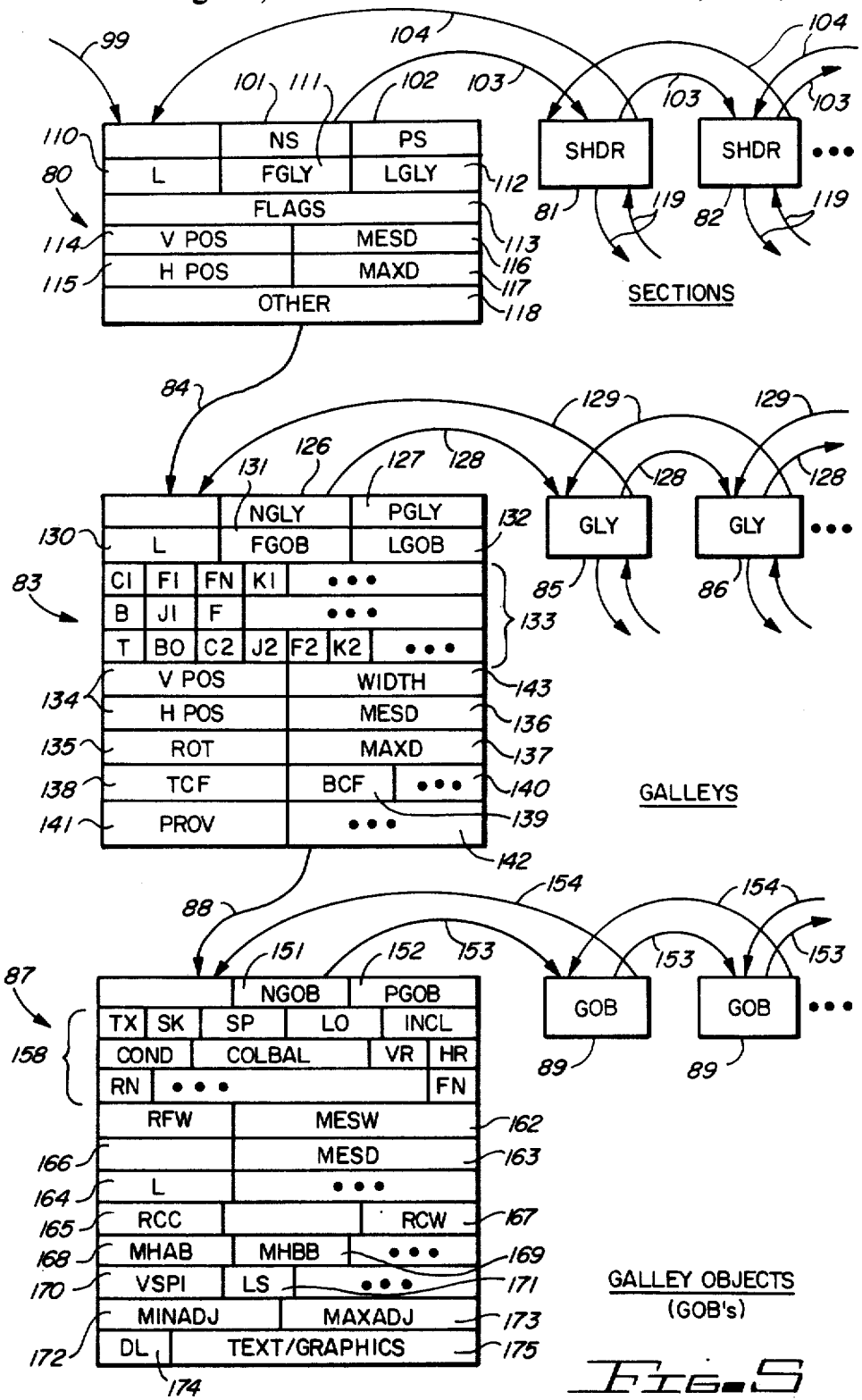
FIG. 5 illustrates data structures used to control text formatting by the FIG. 1 illustrated apparatus.

Referring now more particularly to the drawings, like numerals indicate like parts and structural features in the various diagrams. The general operating environment of a text processing system in which the present invention preferably is practiced is shown in FIG. 1. An operator interactive terminal 10 has a keyboard and associated graphics display, such as CRT 12. The interactive terminal 10 is suitably cabled to a programmed digital computer 13 via cable 14. Cable 14 also diagrammatically represents any input/output multiplexing communication and channel controls, as are widely practiced in the data processing art. Computer 13 has its own data storage 15, preferably in the form of direct access storage devices, DASD. The hardware construction of computer 13 follows general purpose digital computer design, such as used by International Business Machines Corporation, Armonk, N.Y., in machines identified as the 3031, 3033, 3081 and 4300 series, for example. FIG. 1 illustrates computer 13 in a logical form wherein each program of significance to practicing the present invention is shown as an internal block portion of computer 13. APGM 20 is the application program associable with interactive terminal 10. A typical APGM 20, when practicing the present invention, would be an interactive text-editing program of any type. Further, APGM 20 can be a payroll or other form of program which results in printout or display using formattable text and graphics, as will become apparent. A job-entry system, JES 21, interfaces with the usual operating system and is included in other programs 19. JES 21 assigns jobs to various programs in response to job control language (JCL) inputted through interactive terminal 10 or through other means, as is well known. When APGM 20 has completed its functions and desires to have a document composed and formatted, APGM 20 initiates operation of text and graphics formatting by formatter 22. Formatter 22 can consist of a program such as the Document Composition Facility, IBM program no. 5748-XX9. The present invention provides certain enhancements over the formatting capabilities of the Document Composition Facility, Release 2, as described in IBM publication GH20-9158-2 entitled, "Document Composition Facility and Document Library Facility, General Information." The signals representing formatted text and graphics are supplied by formatter 22 to JES 21.

A Document Library Facility, LIB 23, provides for accessing DASD 15 with respect to certain textual and control information usable by the Document Composition Facility or formatter 22. Since the formatter 22 is only concerned with formatting documents, a font program, font 24, provides font information to formatter 22. Generally, formatter 22 will work with identification of fonts rather than the actual font symbols as represented by raster patterns or vector patterns, as usually stored in DASD 15. Formatter 22 upon completion of formatting a document, including identification of fonts either independently or via font 24, can initiate print program 25 or store the formatted text/graphics in a DASD 15 file for later retrieval for a printing operation. Print program 25, also termed an output writer, is designed to operate and supply textual and graphics data to an output printer, such as all-points addressable printer 30. Printer 30 receives commands and data from computer 13 via input/output or peripheral cable 31. Cable 31 diagrammatically represents the input/output channels and attachment circuits usually found in coupling printer 30 to computer 13. An all-points-addressable printer is exemplified by the IBM 3800 printer, Model 3. Such a printer generally has a set of electronic circuit controls 32 for controlling the printer. The 3800 Model 3 printer employs tractored paper, i.e. paper with tractor holes on one or both sides of the paper. Such paper is usually fan-folded to produce a stack of printed output, as at 33. Typically, an all-points printer 30, if a high speed printer, may have a burster-trimmer-stacker which automatically processes the printed document. Any type of fast or slow printer or other form of visually presenting a composed and formatted document may be advantageously employed with the present invention.

FIG. 2 is a simplified flow diagram illustrating the general flow of document preparation. At step 40, text is created. Typically, this can be through an interactive terminal 10 operating with an application program, such as program 20. Other forms of text can be automatically generated, such as by a payroll program, advertising analysis program, computer simulation program which simulates various physical and logical manifestations and the like. At step 41, the text is edited. Steps 40 and 41 can occur simultaneously or can be sequential. At step 42, the edited text is marked for formatting such as by the GML (generalized markup language) employed with the Document Composition Facility. Such language is a tag control format marking with enhanced human factors. At step 43, formatter 22 formats the document. Formatting a document can occur simultaneously with marking a document. However, in the present environment, the formatting chores are taken from the operator for enabling the operator to perform other functions; formatter 22 has sufficient algorithmic controls to aesthetically format the proposed document. Some generalized markup language (GML) commands formatter 22 how to format the document. The formatted document is then supplied to a printer or display, as at step 44.

FIG. 3 is a simplified showing of a formatter 22. Generally, a formatter has a format control program 50 which synchronizes the operation and coordinates all of the formatting functions. Various specialized functions are performed by program modules within the formatter 22. For example, margins within a logical page, i.e. an area of a sheet of paper which is defined as a page, is controlled by margin control 51. Indenting paragraphs and inserts is controlled at step 52. Addition of reference numerals is controlled by REF NOS 53. Line formatting, i.e. line spacing, hyphens, and so forth, is controlled separately at step 54 and 55. Paragraphing controls are handled at step 56. Font selection and management are handled at step 57. Column justification and setups are handled at 58. Headings and footings are handled at step 59. Other functions are indicated by ellipsis 60. All of these functions are designed to operate for defining text and graphics data within the logical page such as shown in FIG. 4.

Referring next to FIG. 4, the structure of a logical page is illustrated. Logical page 65 is a defined portion of a document presentation area, such as a sheet of paper or display screen. A logical page can be contiguous with, be one-half of or be any arbitrarily-defined portion of a document presentation area. Generally, location of a logical page within a document presentation area is determined by X and Y (abscissa, ordinate) two-dimensional rectangular coordinate locations. Within each logical page, a margin 66 is interposed between the textual material to be described and the edge of the logical page as defined. A heading space 67 occurs at the top of a text portion of a logical page. A title space 68 is then provided; when a page has no title, then the vertical depth of the title portion is zero. A running header 69 occurs immediately below the title section. The next major section is the body 70 of the text. The body is divided into arbitrary sections 71, 72. The present invention concerns text formatting within a given section of body 70; the invention is applicable to justifying multiple columns of any textual or graphics material. Immediately underneath body 70 is a footnote space 73. Running foot 74 follows the footnote 73. A foot title 75 is provided followed by the footing space 76.

For automated document formatting, efficient data structures representing the document are manipulated to generate format defining signals. The defining format signals are then sent to the printer or display for presenting the document. For purposes of the present description, those data structures used to describe a section 71 of body 70 (FIG. 4) are described with respect to FIG. 5. The relationships of these data structures to other section 72 defining data structures is also set forth.

Section 71 is generally defined and identified by a section 80. Sections 72 are similarly respectively defined by section headers SHDR 81, 82. The represented document portion within section 71 has text and graphics defining data structures chained to section 80. A first data structure, called the galley definition block 83, defines those document portions termed in the typographic art as a column, float, footnote, keep, heading, running foot, widow and the like. For each section, there generally are a plurality of galleys as indicated by numerals 85 and 86. The chaining from section 80 to galley 83, the first galley of the section, is indicated by arrow 84.

The just-described section header 80 and galley 83 contain control information necessary for printing and formatting the document. Additional control information and the actual text and graphics are contained in galley objects (GOBs), such as GOB 87 which is pointed to and chained to galley 83 as indicated by arrow 88. Of course, for representing any document, there will be a large plurality of GOBs, as indicated by numeral 89. All of the above-generally-described data structures are chained together as will be described in the detailed description of each type of the respective data structures.

Before proceeding further, some of the above-referred-to typographic terms are defined. A column is a vertical section of a logical page separated from other text or graphics by a rule or vertical blank space. A keep is a section of text or graphics, such as a bar graph, which cannot be split for justification, i.e. the keep galley defines text and graphics that must be kept together. Generally, a keep is retained within a column if it is defined as being in that column. A float galley represents data and graphics that must be kept together but can be moved about on the logical page, as from column to column. A widow is the start or end of a paragraph or of a column of textual matter that is undesirably short. For example, in a column, two lines of text are defined as a widow, i.e. cannot be left alone in a column; it is usually undesirable to move widow text from associated text heading consisting of bold or display type. A footnote is text usually in small type which is usually a reference to other documents, a further explanation or comment and is generally placed after the bottom of the body of the logical page. The running foot contains miscellaneous text at the bottom of the logical page, such as page numbers.

The section header 80, as well as all other section headers, is stored in a main memory (not shown) portion of computer 13 at predetermined addresses. A pointer, represented by arrow 99, provides addressability and access to section header 80. A plurality of pointers tie the section headers 80, 81, 82 together to completely identify body 70. NS 101 contains a pointer to the next section. Arrows 103 indicate the pointing from one section header to a next section header. The chain is doubly linked. A previous section header is indicated in PS 102. In a similar manner, arrows 104 indicate the pointing action from a section PS 102 in one section header to the previous section. PS 102 in section 80 is all zeroes as it is the first section header within body 70. In a similar manner, the last section header, such as one of the section headers 82, has its NS section 101 equal to zero for indicating that it is the last header in the chain of headers. L section 110 indicates the length of the section header. FGLY 111 is a pointer to the first galley in the chain of galleys appended to the given section header. For example, FGLY 111 in header 80 corresponds to arrow 84 pointing to galley 83. LGLY 112 is a pointer to the last galley in the chain of galleys appended to the given section header.

Flags 113 indicate certain data parameters for the stored text or graphics. The flags are not individually shown but can be easily envisioned from the following description. Such flags indicate, inter alia, whether reference numbering can be required. Other flag controls may also be easily envisioned. Each section header also includes a plurality of so-called section parameters. Such parameters include vertical displacement VPOS 114 which indicates the vertical position of the section in the logical page. For section 71 (FIG. 4), the vertical position corresponds to line 77, which is the Y position from the XY point of the logical page. In a similar manner, HPOS 115 indicates the X, or horizontal, position. As shown in FIG. 4, the X position corresponds to the left-hand margin, as at 78. In the event section 71 does not extend from left margin to right margin, then other horizontal positions can be used with equal facility. It is preferred that the positioning of the sections within the logical page be accomplished in device units, i.e. PELs (print elements). MESD 116 contains an entry indicating the measured depth of text or graphics currently assigned or formatted in section 71. This number indicates in PELs the actual graphics or text occupancy of section 71. The maximal vertical extent of section 71 is indicated by MAXD 117 which indicates the amount of vertical space within logical page 65 that the text or graphics being formatted for section 71 can occupy. Attempting to format a greater amount of text or graphics to this section requires extraordinary programming control beyond the scope of the present description. Other portions 118 contain other control informational bits as may be desired in a practical document formatting control but which are not necessary for an understanding of the present invention. The general data structures for all of the section headers 80, 81, 82, etc. are identical.

Galley blocks 83, 85 and 86 are all identically constructed and generally follow the format of the just-described section headers. NGLY 126 is an address pointer which points to the storage location within main memory (not shown) of the next galley, GLY 85, with the pointing action represented by an arrow 128. GLY 85 has a similar pointer to GLY 86 which is also represented by an arrow 128. PGLY 127 is an address pointer to the location of the previous galley in the chain. Such previous galley pointing is collectively represented by the arrows 129. PGLY 127 of galley 83 is equal to zero since it is the first galley in the doubly-linked chain of galleys. In a similar manner, the last galley in the chain has this NGLY 126 equal to zero. Note that the first and last galley are pointed to in the section header by FGLY and LGLY 111, 112, respectively. In a similar manner, each galley has a first and last pointer to its respective chain of galley objects, GOBs. FGOB 131 points to the first GOB in the doubly-linked chain of GOBs while LGOB 132 points to the last GOB in the chain. L portion 130 indicates the data length of the galley data structure.

Each galley definition block has a set of flags 133. Flag C1 indicates that the galley is representing column text. Flag F1 indicates the galley is representing float data. Flag FN indicates that the galley is representing a footnote and includes data indicating top, bottom or movable float. K1 indicates the galley is representing keep data/graphics. GF indicates a forced column function, i.e. the next column is not balanceable with the present column. Other flags, of course, of this character can identify further types of galleys. The B flag indicates that the columns are balanced. This flag, of course, is useful only when C1 is active. The J1 flag indicates the columns have been vertically justified. Flag F indicates that the galley represents a column of text which cannot be adjusted, i.e. is a so-called "forced" column. The third line of flags includes a T bit for indicating that the columns are to be top justified. The BO bit indicates columns are to be bottom justified. The C2 bit indicates that the columns are to be centered justified. The J2 bit indicates that the columns have been justified. The F2 bit signifies that the galley refers to a float while K2 indicates the galley refers to a keep.

Each galley structure includes a plurality of galley parameters. Included is the XY position of the data represented by the galley as recorded in VPOS and HPOS collectively designated by numeral 134. Additionally, ROT 135 indicates rotational orientation of the text or gaphics. This orientation is preferably set forth in degrees of rotation with 0 and 360 degrees being the top of the logical page; the rotation is measured clockwise. The width of the text in device units is indicated in WIDTH 143. MESD 136 indicates the current measured depth of the text/graphics represented by the instant galley. The maximum vertical depth is indicated in MAXD 137. TCF 138 and BCF 139 respectively indicate top and bottom column floats as being the data represented by the instant galley. PROV 141 indicates that the data or graphics represented by the galley is a provisional top column galley. Other indications can be provided within the galley data structure as denoted by numeral 142.

FGOB 131 points to the first GOB 87 chained to galley object block 83. The GOBs 87 and 89 are doubly-linked chained together in the same manner as the section headers and the galley definition blocks. In each GOB, NGOB 151 points to the next GOB as indicated by arrows 153 while arrows 154 point to the previous GOB from PGOB 152. PGOB 152 in GOB 87 is all zeros while NGOB 151 of the last GOB of the chain of GOBs is similarly zero. GOB flags 158 indicate the type of GOB and certain text qualifications of the GOB. The TX flag indicates that the other controls relate to text contained in the object, or text portion, 175. SK flag indicates that a skip is represented by the instant GOB. A skip concerns blank or white space in a formatted document. The depth or duration of the skip is indicated in portion 175, i.e. the number of line spaces, for example, in a line printer, the number of PELs in an all-points-addressable printer, the number of CRT spots in a display and so forth. SP indicates a blank space in the vertical direction with the amount of space being indicated in portion 175. LO indicates a lead-out which is a point in vertical formatting of a document which can receive additional blank space for vertical justification, as will become more apparent. INCL indicates that the data represented by the GOB includes a page segment (predetermined text or images which are addressable as a unit, i.e. by a name) which is stored in portion 175.

Flags 158 also include GOB qualifiers. For example, COND indicates that some of the functions in formatting are conditional. For example, the skip and space functions may be conditional on predetermined parameters. COLBAL indicates that the instant GOB is a skip added by the later-described column balancing format operation. VR and HR respectively indicate vertical and horizontal rules further defined in portion 175.

Each GOB has a plurality of GOB parameters. MESW 162 indicates the measured width of the GOB containing text/graphics while MESD 163 indicates the corresponding measured depth. These measurements can be in device units, such as PELs, character units, line spaces and the like. L field 164 indicates the data length of the instant GOB. Other parameter fields may be included.

Each GOB indicates whether or not a revision code is active. A first revision code RCC 165 identifies a revision code character. RFW 166 indicates the width of the revision code field while RCW 167 indicates the width of the characters or symbols within the revision code fields. In other words, not only can portion 175 contain text/graphics but selectively can provide selected revisions.

The GOB also indicates maximal line height or vertical depth. MHAB 168 indicates a maximal symbol height of a line of text above a defined text base line. In a similar manner, MHBB 169 defines the maximum vertical depth below the above-mentioned text base line. These depths are again defined in terms of PELs or other suitable device interpretable units.

Additionally, the GOB includes vertical justification values usuable for controlling vertical justification and balancing of columns. VSPI 170 defines the incremental value for adjusting vertical space. For example, in an all-points adjustable printer, a minimal vertical space increment may be one PEL, two PELs, four PELs and the like. In a similar manner, LS 171 indicates the minimum line space, i.e. the space between two adjacent and successive text lines. In addition, factors are provided for indicating in a percentage or ratio the range of adjustments for various vertical format parameters. For example, MINADJ 172 gives the adjustment factor for minimum vertical depth of text, space and skip. In a similar manner, MAXADJ 173 identifies a maximum factor for adjusting text, space and skip in vertical depth. For example, a font may have a given absolute value for space between the lines, the space when a line is skipped (double spacing), spacing between symbols, spacing between sentences and the like. These values would have a factor of unity. The minimum factor in field 172 specifies the minimum adjustment as a percentage of the unity factor, for example, 0.8. In a similar manner, the maximum adjustment in field 173 can be 1.2, or a 20 percent increase in spacing.

The actual text and graphics contained in the respective GOBs are in field 174 and portion 175. DL field 174 indicates the length of text or graphics in portion 175. Such length is preferably expressed in bytes.

Figure 6:
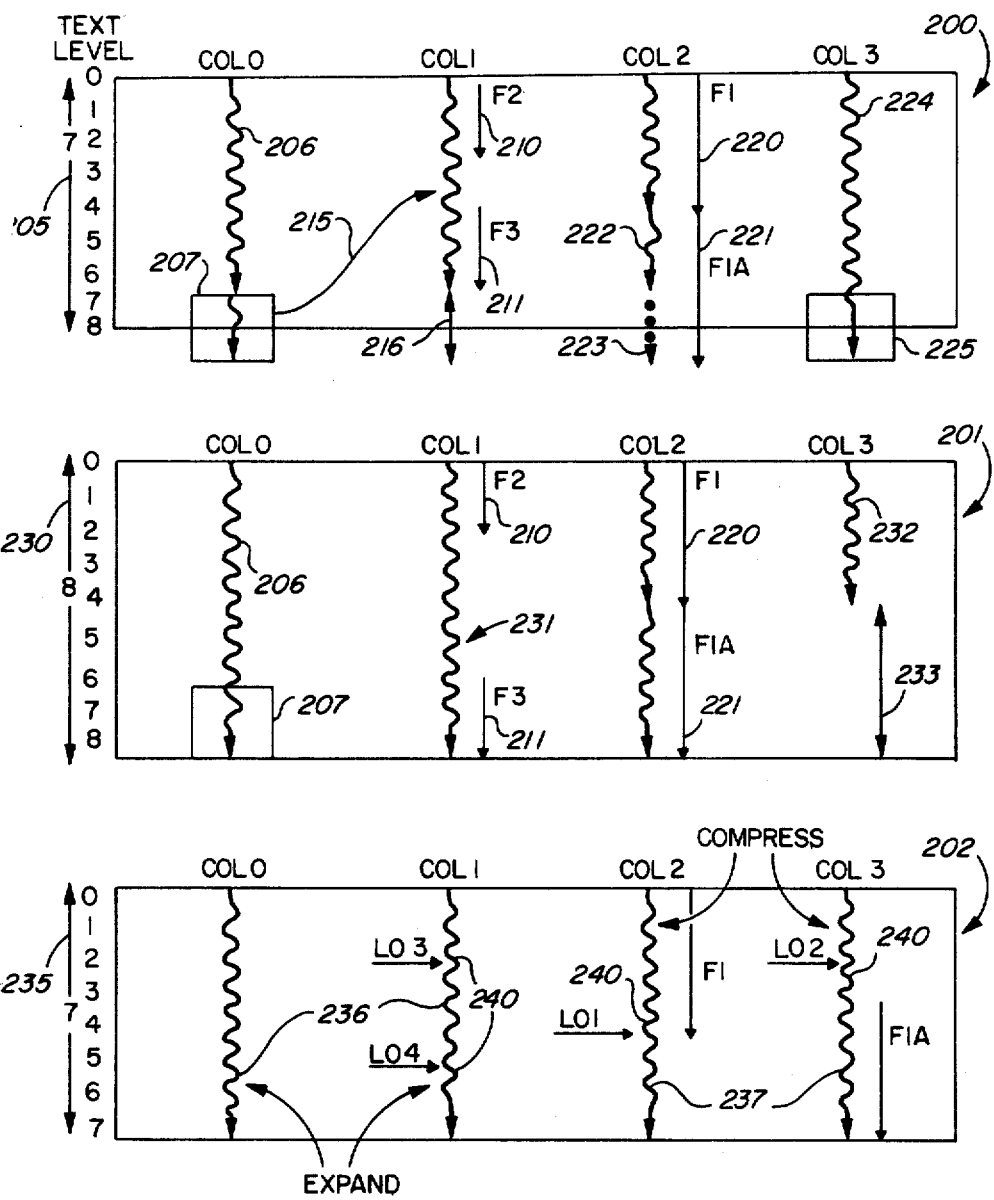
FIG. 6 illustrates various text distributions in a multi-column format for illustrating certain aspects of the present invention as practiced in the FIG. 1 illustrated apparatus.

FIG. 6 illustrates the general procedure of text distribution and vertical justification. Generally, two algorithmic based procedures are employed for text distribution which achieve minimal differences between the depth of a shortest (nonempty) column and the depth of a longest column. The first procedure begins at a minimal column depth and then recursively extends a common column depth (the ultimate column depth of all columns) until an appropriate distribution of text is found or a given number of recursions have occurred. The second, and preferred, procedure begins at an optimal common column depth. If that optimal column depth results in a text distribution having a given acceptable, minimal difference between a shortest column and a longest column, then the common depth is used to achieve a minimal column depth. The text is logically distributed at the minimal column depth. If the text distribution does not meet certain requirements of difference in depths between a shortest column and a longest column, then the text is recursively distributed at a longer column depth. If none of the text distributions result in an optimum text distribution, then the best distribution will be selected. Any recursion wherein an optimal text distribution is achieved stops the recursive processing.

FIG. 6 illustrates a two-recursion, increasing-depth text distribution and a following vertical justification for a four-column set of balanceable columns. At 200 text is distributed between columns 0 through 3 using a depth of 7. This distribution does not meet predetermined criteria. Accordingly, at 201 and at a greater column depth, the text is again distributed. Again, the text distributiion does not meet predetermined criteria. As shown in FIG. 6 the text distribution 200 yields a better text distribution than the distribution at 201. That is, the disparity in depths between the shortest and longest columns at 200 is less than the disparity between the longest and shortest columns at 201. Accordingly, the depth at recursion 200 is selected for vertical justification at step 202. A point to remember is that an improved text distribution may be achieved by a shorter common column depth than what might appear to be an optimal column depth. As will become apparent, there is a certain minimal column depth determined by the text length, i.e. the number of lines to be distributed and the characteristics of the text and graphics to be distributed, such as keeps, widows and so forth which are text that cannot be split between two adjacent columns.

The distribution recursion at step 200 selects a column depth at step 205 of seven line spaces units. Preferably the units are related to a printing or display device or a font currently being employed for printing or displaying the text being formatted. The text distribution in columns 0 through 3 proceeds from the left-most column to the right-most column, i.e. in the direction of normal reading of text using Latin fonts. Numeral 206 refers to a wavy vertical line representing text for printing in column 0. At 207 a two-unit widow is found. In accordance with a first procedure when a widow 207 extends beyond the base line or common depth 7, it is distributed to create an eight-unit column 0.

The text in column 1, also represented by a vertical wavy line, includes a pair of text floats F2 and F3, also represented by vertical arrows 210 and 211 respectively. A float can be located anywhere within column 1 but, in accordance with text commands, can be restricted to being located at the top or bottom of a given column. The distribution of text in column 1 reaches level 6 of the column. It may well be that the widow 207 assigned to column 0 could fit in column 1 as represented by arrow 215. In the particular text arrangement shown in recursion 200, widow 207 can only be located at the bottom of column 0.

Column 2 includes a plurality of floats such as F1, represented by arrow 220, which is at the head of the column. Float F1A, represented by arrow 221, in column 2 could limit the column distribution to eight units; eight lines or units are required to put F1 and F1A in column 2. The description of FIG. 6 assumes that float F1A does not exist. The text in column 2 represented by numeral 222 extends down to the sixth unit, with the text represented by dotted arrow 223 being moved from column 2 to column 3 wherein it is text represented by wavy line 224. At 225 another widow may occur. If the seven level column depth were used and more columns existed to the right of column 3, the widow 225 could be moved to such other column. If the eight level column depth were employed, then widow 225 could remain in column 3.

Assume that the acceptable difference in the depth of a shortest column from a longest column is one unit. As shown in FIG. 6, recursion 200, the difference is two units. Accordingly, recursion 201 is employed using eight units 230 as a common depth of text distribution. The distribution again proceeds from the left-most column to the right-most column. Text 206 easily fits into column 0 as does widow 207. Float F2 appears at the heading of column 1 while float F3 appears at the bottom of column 1 with normal text being distributed in column 1 as represented by numeral 231. In column 2 float F1 220 appears at the head of the column. Other text appears to the bottom of column 2 including the alternate float F1A represented by arrow 221. The remaining text 232 in column 3 only goes to level 4, leaving a difference between the shortest column 3 and the longest column 0-2 as of four units as represented by arrow 233. In accordance with the above, the distribution by recursion 200 is much better than the distribution by recursion 201. Accordingly, the distribution of recursion 200 is selected for vertical justification. It is to be understood that additional recursions can be employed for obtaining a more optimal text distribution, it being understood that the distribution process described with respect to FIG. 6 is exemplary. Also, the distribution at recursion 201 could be considered an optimal depth text distribution. In that instance the recursion 201 would occur first followed by recursion 200. If neither of those provided an adequate text distribution (difference between a shortest and longest column of not greater than one unit or line space), then additional distributions and text could be provided in subsequent text distribution recursions as will become apparent.

Vertical justification at 202 is achieved at a common column depth of seven units as represented by arrow 235. Columns 0 and 1 from the recursion 200 have to be expanded and are done so by adding space between lines in areas 236 in columns 0 and 1, i.e. the spacing is increased at the bottom of the column. Columns 2 and 3 are to be compressed. Such compression occurs at the top or head of the column as at 237. In this manner the general aesthetic appearance of the columns in the balanceable set appears to be more dense at the tops and lighter at the bottoms of the respective columns.

If the lead-outs, line spaces and other adjustments as will be described do not completely vertically justify the columns in the balanceable set, then further adjustments through the use of so-called lead-outs, L01 through L04 and collectively enumerated 240, may be employed. Such lead-outs can add space in accordance with text processing instructions, as will become apparent. Please note that the vertical justification occurs within the widows and floats independently of their text distribution status. The vertical justification is font oriented; that is, each font has an optimal line spacing. Other spacing units such as skips, paragraphing and so forth are handled in accordance with later-described text instructions. A range of adjustments is set for each font which indicates the limits of aesthetic adjustment for achieving justification. This principle also is applicable to horizontal justification.

Referring next to FIG. 7, the general flow of machine operations (hardware and software) for receiving text and graphics distribution to a plurality of columns and subsequent vertical justrification is shown. The description assumes that text processing functions are in process and that formatting is proceeding, such as receiving text at 250. Among the functions of formatting is defining pages at step 251. The definition of a page by a formatter is known and not pertinent to an understanding of the present invention. When a page has been defined, which may include definition of one or more columns of text and graphics, machine operations then determine at step 252 whether or not there are any columns in the just-defined page. If there are columns in the defined page and text is to be distributed and vertically justified, then machine operations proceed to steps 254, et seq. Also, during the definition of a page at step 251 it may be desired before completing the page that a plurality of columns that do not end at the bottom of the page have text distributed and be vertically justified prior to completing the page. Accordingly, the machine operations represented by steps 254 et seq. may be instituted in the middle of a page definition, as represented by arrow 253.

Figure 16:
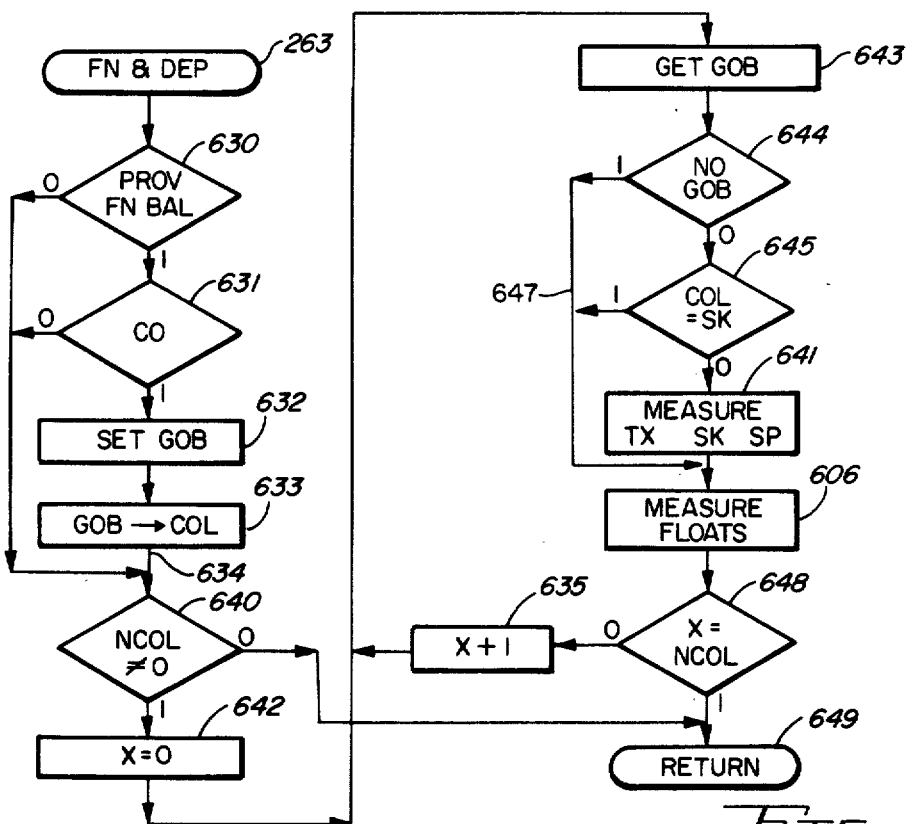

The column balancing involving distribution of text and graphics and subsequent vertical justification includes setting the maximum section depth (MAXSD) at step 254. Then at step 255 the balanceable columns are found (FBCOL). Once a set of balanceable columns is defined, then at step 256 all of the text is logically moved to the left column for later processing. Footnoting (FN) to the columns is handled at step 257. The text distribution is calibrated for implementing the invention at step 260. The actual distribution of text to the balanceable set of columns occurs at step 261. Two different text and graphics distribution procedures are described. A first procedure (FIG. 13) begins with a minimal column depth and then proceeds recursivly by increasing column depths until an optimal depth is found having a minimal text depth difference between the various columns in the balanceable set of columns. The second procedure (FIG. 14) initially defines an optimal column depth for all of the balanceable columns in the set. If the first-attempted distribution at the optimal depth does not provide a minimal difference, then an iterative process is followed for finding a more suitable column depth. In one operation, a first alternate to the optimal depth is a minimal depth followed by a maximal depth. If none of the iterations of text distribution result in a desired minimal difference in column depth, then the optimal depth is selected. At step 263 column depth and footnote checking occurs as shown in FIG. 16. At this point in time the text and graphics to be distributed amongst the various columns in the balanceable set have been fully analyzed, and the chaining of the galleys and galley objects is finalized at step 264. The above described operation completes the text distribution using recursive processing.

Figure 19:
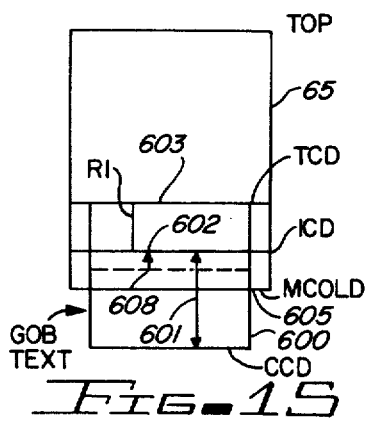
Figure 17:
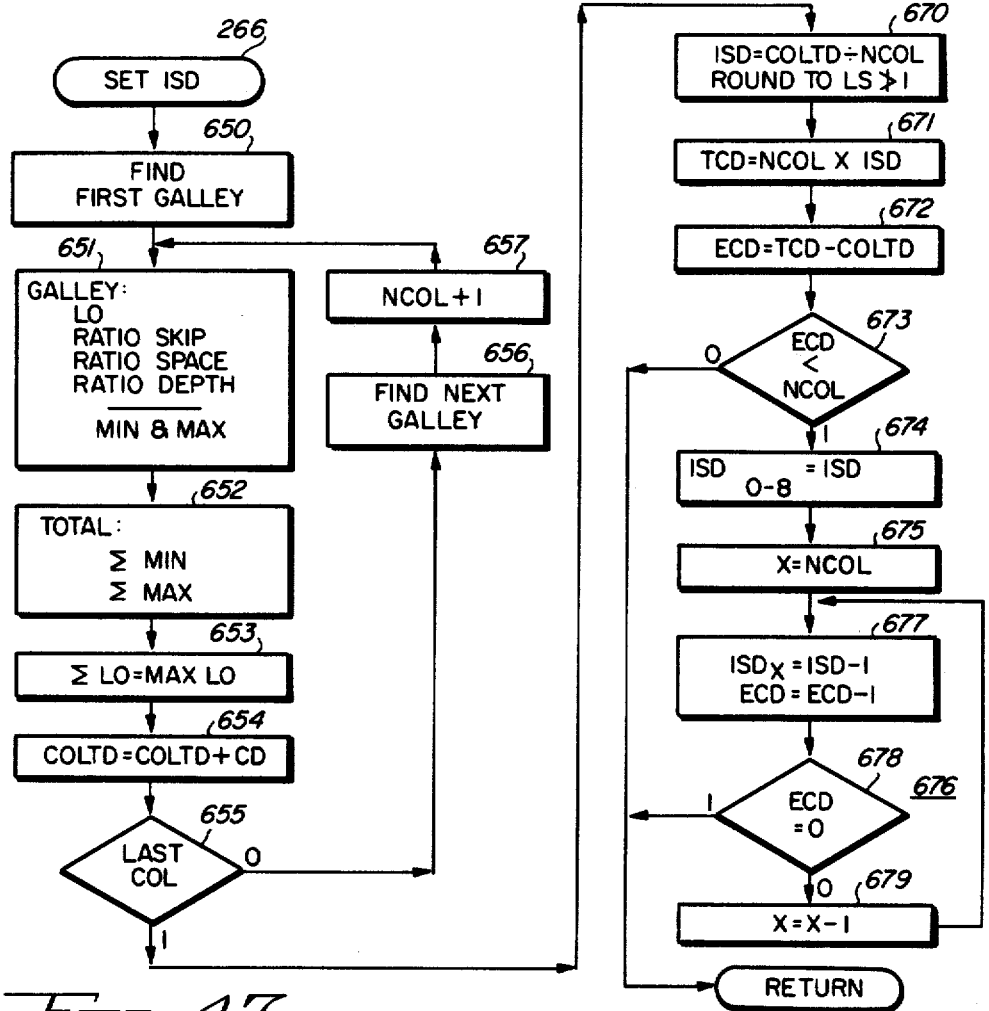
Figure 19:
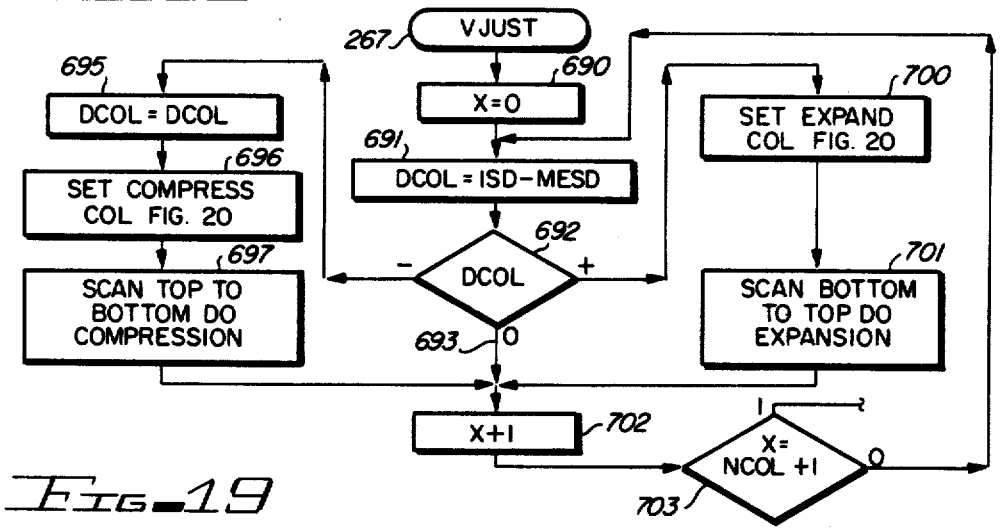

The following machine operations concern vertical justification of the various columns in the balanceable set for reducing the minimal difference between the column depths. Whether or not such vertical justification is desired is checked at step 265. If the vertical justification is to occur as indicated by a control word embedded in the text stream, then at step 266 the machine operations set the initial section depth (ISD) as shown in FIG. 17. The depth is checked for acceptability at step 267 (FIG. 18). Then vertical justification occurs at step 268 as shown in FIG. 19. Following vertical justification, the machine operations follow logic path 279 which joins with the output of branch step 265 indicating no vertical justification to check at step 280 whether or not more text sections are to be handled on the current page. If additional sections are to be handled, as caused by the exit 253 from step 251, step 251 is again entered to complete the formatting of a page of text and graphics. Then step 252 is repeated for balancing additional sets of balanceable columns on the current page. If no more sections are to occur in the page or there are no columns at step 252, then at step 281 whether or not the document preparation is in an "instant mode" is checked. In the instant mode the formatted page is presented as on a CRT interactive display or by a printer. Accordingly, the just-formatted page of text and graphics is then presented at step 282 by a suitable document presentation device. If the instant mode is not used, machine operations at step 283 check for end of text (EOT). If there is more text following, then more text is received at step 250 with subsequent pages being defined at step 251. It is apparent that the just-described text processing is highly cyclic in nature, as is known, particularly with respect to the Document Composition Facility. Upon reaching end of text at step 283, machine operations at step 285 check whether or not the document is to be presented now; if not, the signals representing the formatted page are stored in DASD 15 as indicated generally by numeral 286. If the document is to be presented, then it is presented at step 287 using known techniques. Document presentation can be initiated through JES as indicated by arrow 284 for retrieving a spooled data set from DASD 15 for printing, for example.

It is to be appreciated that the above description of text processing and formatting is highly simplified for the purpose of illustrating how the present invention can be embodied into a formatter. For a full appreciation of formatting operations, reference should be made to the IBM publication SH20-9161 supra.

Figure 8:
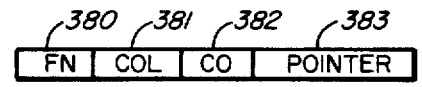
FIG. 8 illustrates a plurality of data structures usable in connection with the FIG. 7 illustrated flow chart.

The data structures of formatter 22 used internally in connection with describing the present invention are shown in FIG. 8. Additionally, certain data structures not intimately associated with the detailed machine operations for giving an understanding of the invention are also included for indicating the environment in which such machine operations are performed. Some of the data structures are related to internal address accessing using known software techniques, hence such software need not be described. Only those data structures indicating the character of such addressing in actual machine operations which ensue are detailed for giving a better understanding of the invention.

Data structures 300 consist of a plurality of so-called anchors which represent registers within the main memory (not shown) of processor 13 which contain address indicia for accessing other data structures. The location of the anchors within main memory 13 is referenced by software in the usual manner. Hence, if the software wants to access a particular data structure, it goes to a fixed address represented by data structure 300 for accessing the current address of the to-be-referenced data structure. Columnar data structure 301 is a so-called galley data structure of column which consists of a plurality of anchors that point to each type of galley indicated. Once a galley 83 has been located, then its pointers FGOB 131 and LGOB 132 point to the galley objects providing addressing capability to each object through the anchor 301 and the galley structure itself. It should be noted that at this point in time the GOBs 87, 89 have not been assigned to a logical page but are pending for the page assignment, i.e. the formatting is now beginning. In the structure of the formatter 22, there are several types of current "impending galleys," each of which is pointed to by a separate galley anchor. In the galley anchors 301, FNOTEQ points to a queue of galleys which identify footnotes which have been queued for greater flexibility of the formatter. Each time a footnote is identified during a formatting operation, its corresponding galley 83 is added to the queue. In a similar manner, FLOATQ shows all of the pending floats to be formatted on a given page. In this regard it should be pointed out that the queue includes all of the floats for all of the columns which may include one or more sets of balanceable columns. In a similar manner KEEPQ is a queue of the pending KEEPs. The section anchor SCTSCT points to a section 80.

In this regard it may be noted that during the formatting operation, the galleys may be logically dissociated with the section in that the galley may be independently processed for purposes of balancing and justifying columns, i.e. access to the galleys is independent of the section 80. FNLSCT in an anchor for the footnote header, i.e. the control information for a footnote which corresponds to the control information shown in FIG. 5, as in a GOB 87. A plurality of galleys 87 which are identified through the corresponding flags 133 include GOLGLY, FLGLY, KPGLY, FNGLY and WZGLY which respectively are anchors for a column galley, float galley, keep galley, footnote galley and a widow galley. The section data structure 302 has a similar set of anchors for sections of a logical page. Note that at the early stages of formatting SCTSCT of galley anchor 301 points to the section that will point to the first galley within the section. The galleys are chained according to their position vertically and horizontally within the section, i.e. the galleys are a representation within processor 13 of the logical page. When the section within the logical page is completed, the individual galleys in the section will be chained to previous galleys that exist for that type of section; the galleys will be chained according to their physical position left to right and top to bottom. The anchors in section 302 include FNOTEQ for a footnote pending galley, FLOATQ for a pending float galley and KEEPQ for a pending keep galley. A pending galley is a galley representing text or graphics that has not yet been physically located in a logical page. The other anchors include SCTTT for the top title 68 and SCTRH for the running header 69; SCTTPF is the top page float anchor, i.e. the section 71 for example; SCTBODY is the anchor for the body 70, i.e. points to the first section 80 within the body; SCTBPF points to the bottom page float which corresponds to the bottom section 72 of body 70; SCTFN points to the footnote 73; and SCTRF points to the running foot 74 while SCTBT points to the bottom title 75.

The above anchors 300 provide for global access to the text-representing data structures represented by the showing of FIG. 5. Additionally, a large number of data structures which are used as an interim data storage are employed by formatter 22. Each of such interim data structures represents registers within main memory (not shown) of processor 13 used by formatter 22 in carrying out the machine operations described later. MAXSD 310 shows the maximum section depth. This register contains control information which indicates to the formatter 22 the maximum permitted length of a column within the section. ICD 311 contains interim information of the initial column depth during distribution of text to the columns within a balanceable set. ISD 312 is the initial section depth representing the initial depth following text distribution to the columns in a balanceable set and is set just prior to the vertical justification operations. RK 320 indicates the number of columns already scanned in a scan of columns in a set of columns. NCOL 321 is a register containing the number of columns within a balanceable set of columns. LAST PASS 322 contains a number indicating whether or not the iterative or recursive text distribution processing has proceeded to a last recursion or iteration. GLYN 323 is an address pointer to the next galley 83 to be processed. This particular register contains the galley address for enabling formatter 22 to process a series of galleys, i.e. it is a register containing a synchronizing address to ensure that all galleys are processed and that the same galley is not processed twice. LCD 313 contains data indicating the longest column depth during a given recursion of iteration of text distribution during a column balancing process. SCD 314 correspondingly contains information indicating the shortest column depth. CCD 315 contains information indicating the current column depth. A plurality of registers 316 denominated C0D–C8D contain the respective current depth of various columns being balanced. Accordingly, it is seen that up to nine columns can be balanced as a set using the present implementation. SCTD 317 indicates the current section depth during the various justification and distribution processing. SCTD 317 must contain a number smaller than the number stored in MAXSD 310. RATIOS 326 represents a set of registers containing the ratios of adjustment permitted for all of the vertical parameters used in connection with vertical justification. For example, the line spaces between two vertically adjacent base lines of two successive lines of text on a logical page can be either reduced (text compression) or expanded (text expansion). The user can specify that compression can be up to 10 percent while expansion can be up to 20 percent. Such compression and expansion ratios will vary from font to font and from document to document in order to meet desired aesthetic quality. Similar ratios are for adjusting vertical spaces (nontext vertical areas) and leadouts. COLTD 327 indicates the total depth of all of the columns within a balanceable set of columns. Such total depth can be the number in NCOL 321 multiplied by ICD 311, for example. COLTD 327 contains a number which is never less than the total text depth contained in TTD 328, which is a number representing the total vertical depth of all of the text within a set of balanceable columns, i.e. the total text to be distributed in the columns of the balanceable set. GOBN 324 and SCTN 325 respectively indicate the address in main memory (not shown) of processor 13 containing the GOB 87 and section 80, respectively, to be next processed in the sequential formatting procedure. FDN 335 has nine registers which contain the float depths for columns, respectively. Remember that floats generally cannot be moved from one column to another column; hence, the original float assignment to the columns restricts the text distribution processing. LFD 337 is a register containing the longest float depth in any of the columns of the balanceable set. LFD 337 contains a number indicating the absolute minimum section depth for a set of balanceable columns. Since the floats cannot move from one column to another, the longest or deepest float depth provides one minimum value for a common column depth of a balanceable set. SFD 338 contains the shortest float depth of any column. TFD 339 contains the total float depth in the set of balanceable columns.

TCD 340 contains the total column depth which is the product of NCOL 321 times the number of columns to be balanced at the current common column depth. TCD 340 contains a number which is never less than the number stored in TTD 328. DCOL 345 is a register for containing an intermediate calculated depth for the column currently being processed. NCOLF 346 indicates the number of columns found for a balanceable set. NCOLF 346 contains an intermediate number in reaching NCOL 321. MINTOT 347 and MAXTOT 348 respectively contain the minimum and maximum total vertical distance which can be adjusted respectively for a given column being vertically justified for each of several adjustment parameters. Such totals for each parameter are calculated based upon the ratios contained in registers 326 together with the number of increments contained in NUMI 330.

Different algorithms are the basis of two different text distribution procedures used for implementing the present invention. One algorithm is recursive in that subsequent recursions of text distribution do not necessarily reduce the depth difference between the shortest and longest column depth. The second algorithmic-based procedure is an iterative process which tends to reduce the differences between the longest and shortest columns in the balanceable set. In the recursive process, the maximum number of recursions can be equal to the number of columns in the balanceable set, although in most instances satisfactory text distribution can be achieved with but two or three recursions. Accordingly, a set of registers 350 contains the initial section depth zero through eight for the respective up to nine recursions in a first procedure for text distribution. Registers 351 store the ISD value for each of the columns in a balanceable set, C0–C8. Registers 352 contain the difference values between the shortest and longest column depth from each recursive distribution zero through eight for the recursive processing. Within the recursive and iterative processing, the actual or measured depth of the longest column is maintained in MESD 355. As will become apparent, the various text distributions can result in column depths greater than or less than the desired common depth. LOMAX 356 contains maximum value for each of the respective columns that can be added in expanding the column depth. LO is the abbreviation for lead-out; upon initial text distribution all lead-outs have a zero vertical depth. Each separate lead-out has a maximum vertical depth.

For the vertical justification procedures, RDEPTH 365, also referred to as RD, indicates the remaining depth of the column to be vertically justified. NEXTCOL 366 identifies the number of the next column to be processed. MAXLO 367 indicates the largest lead-out in the respective column. GOBD 368 is a temporary register containing the depth of the GOB it is processing. GLYD 369 is similar to GOBD except for indicating the depth of the galley. NCOL-PROC 375 indicates the remaining number of columns to be processed. RE-CHAIN 376 is a flag indicating that the GOBs and galleys need to be rechained to the section header.

LOSP 377 stores the lead-out space to be used in vertical justification. ECD 353 contains a value for the estimated column depth for vertical justification.

Footnote handling, as described later with respect to FIG. 17, requires control information stored in registers 380–383. The footnote FN 380 identifies existence of a footnote for a column identified in COL 381. As will become apparent, during the text distribution, the footnote identified in FN 380 is appended to a column 381 as opposed to being operatively associated with the logical page. CO 382 identifies the callout within the columnar text while pointer 383 indicates the location in the memory of processor 13 where the footnote resides.

For vertical justification, intermediate controls are employed for each column to be vertically justified. Registers 386 et seq. contain these control informational factors. SKRATIO 386 contains the skip ratio adjustments. For formatting by formatter 22, the maximal depth in a particular document presentation may be desired not to be used. Accordingly, the SKRATIO indicates what percentage of the maximal skip depth can be used for a given document presentation. The ratio includes both compression and expansion ratios. SPRATIO 387 contains the same type of ratio for spaces as does the skip ratio for skips. TXRATIO 388 contains the same ratios for textual material. For example, text may be singly spaced, double spaced or triple spaced and the ratio may be adjusted accordingly. The spaces associated with SPRATIO 387 are in effect empty lines between successive text lines. Registers 390–392 contain various column depth values respectively indicated as DCOL', DCOL" and DCOL'" and used in connection with vertical justification. Ellipsis 393 indicates additional control factors which may be used in connection with a practical embodiment of a formatter 22 but which are not necessary for indicating the immediate environment and operation of the present invention in the illustrated formatter.

Figure 9:
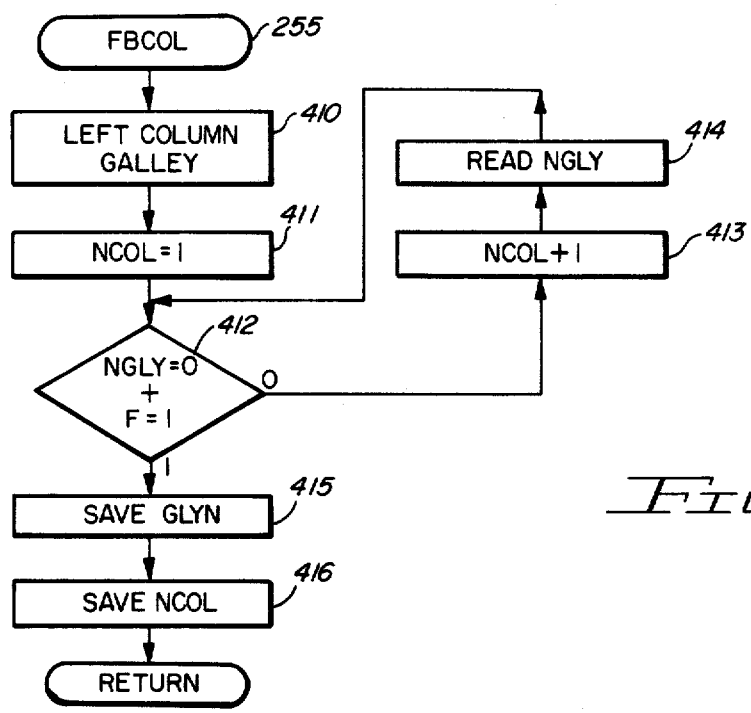

Finding a set of balanceable columns is initiated at step 255 of FIG. 7 and implemented as shown in FIG. 9. At 410 the galley 83 corresponding to the left-most column is accessed. This step is the first one for determining the number of columns in the balanceable set. This is achieved by scanning all of the galleys in the set of columns and examining NGLY 126 for indicating the end of the chain. At the beginning of the scan at 411, NCOL 321 is set to unity, i.e. only the left-most column has been identified to this point. At 412 the next galley 85 pointed to by NGLY 126 is examined. If that NGLY 126 is not equal to zero and the galley in fact does exist (GLYF = 1) then at 413, NCOL 321 is incremented by unity and the next galley is read at 414. The loop 412–414 is repeated until NGLY 126 of the last-examined galley equals zero (end of the columns) or until the flag 133 F (FIG. 5 galley force) equals unity to indicate the next column is not a part of the balanceable set. Then at 415 if F = 1 the next galley to be read is saved at 323 for processing the next set of balanceable columns. In the event NGLY = 0, reference is then made to the next section by storing the proper address in SCTN 325. At 416 NCOL is stored in area 321 of FIG. 8. The number of columns together with the left-most column has now been uniquely identified such that distribution of text through the column can ensue.

The first step in the distribution of text data for balancing purposes among the columns in the balanceable set is to identify the total text length (TTL) as initiated in step 256 of FIG. 7. Measuring TTL amounts to logical moving of all of the text to the single left-most or first column identified with respect to the FIG. 9 illustration. Moving the text to the left-most column merely takes the GOBs 89 from the galleys 85, 86 for all of the columns other than the left-most column and logically attaches those GOBs to the single galley 83 for the left-most column by adjusting the galley pointers NGLY 126 and PGLY 127. The subsequent distribution will logically reattach the GOBs (by adjusting pointers NGOB 151 and PGOB 152) either temporarily or permanently to the appropriate galleys in an arrangement of text distribution which tends to equalize the depths or lengths of the columns within the balanceable set.

Referring now to FIG. 10, moving the text to the left-most column includes examining at step 420 NCOL 321 (FIG. 8) to see if it has a value greater than 1. If not, then logic path 421 is followed to step 265 (FIG. 7), i.e. no balancing is required since there is only one column. For balancing activity, at step 422 the total text depth TTD is determined and set into register 328. It should be noted that the total column depth can be and is usually larger than the total text depth. At step 423 the galleys which represent text floats (top or bottom floats) are measured for column "N" (FDN) which establishes a minimal column depth for each of the columns within the balanceable set. FDN is stored in register 335 of FIG. 8 which includes identification of the respective columns. FDN is determined by scanning the galleys for the float flag F1 of section 133. Flag F1 includes indications of whether it is a top float, bottom float or a movable float. Of course, a top float indicates it is at the top of a column, the next bottom float can be in an adjacent or other column or within the same column. F1 also indicates whether or not the adjacent floats are in the same or in different columns. At step 424 formatter 22 identifies the largest float found and stores the identification in register 337. At step 425 the shortest float found is stored in register 338. The total depth or length TFD of all the floats in all of the balanceable columns is stored in register 339 at step 426. All of the above values are accumulated using known scanning techniques by scanning the galleys which indicate they represent a column in field C1 of flag 133 and that the F1 flag indicates it is float data within a column. A return to the FIG. 7 machine operations chart is indicated at step 427.

At step 257 of FIG. 7 any footnotes are assigned to the respective columns such that vertical justification of that particular column and the text arrangement on a page as well as splitting a page will ensure that the footnote stays with the text in the column with which it is textually associated. Accordingly, after moving all of the text to the left-most column, footnote galleys are moved back to the original column. To achieve the above functions as shown in FIG. 11 at step 430 any footnotes are detected. Please note that in galley 83 flag 133 FN indicates that it is a footnote galley. If at step 430 no footnotes are identified in the text to be distributed among the columns, then no further action is taken and a return is taken at step 434 to the FIG. 7 chart of machine operations. If there is a footnote in the columns to be balanced, then at step 431 whether or not there is a callout is determined; if there is no callout, then the footnote need not be spatially associated with the columns being balanced. For example, a footnote may have a reference number 1. Then in the text a corresponding reference number 1 may be found. For such a callout, at step 433 the footnote GOB indicated by FN flag 158 and its associated galley, if any, is chained to the column galley which it originally was associated with in step 251, page definition. Then at step 434 a return is taken to the machine operations illustrated in FIG. 7.

Figure 13:
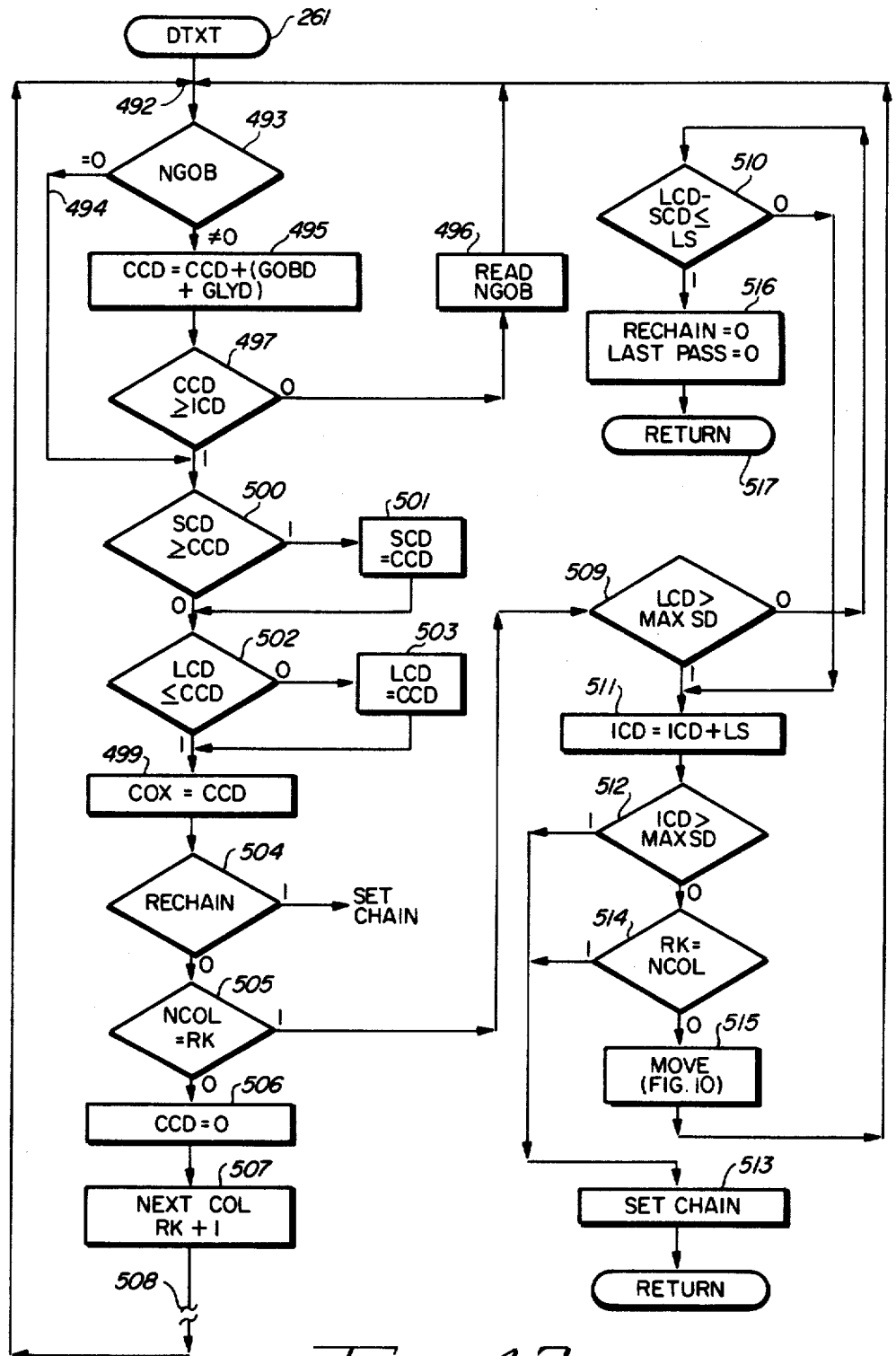
Figure 14:
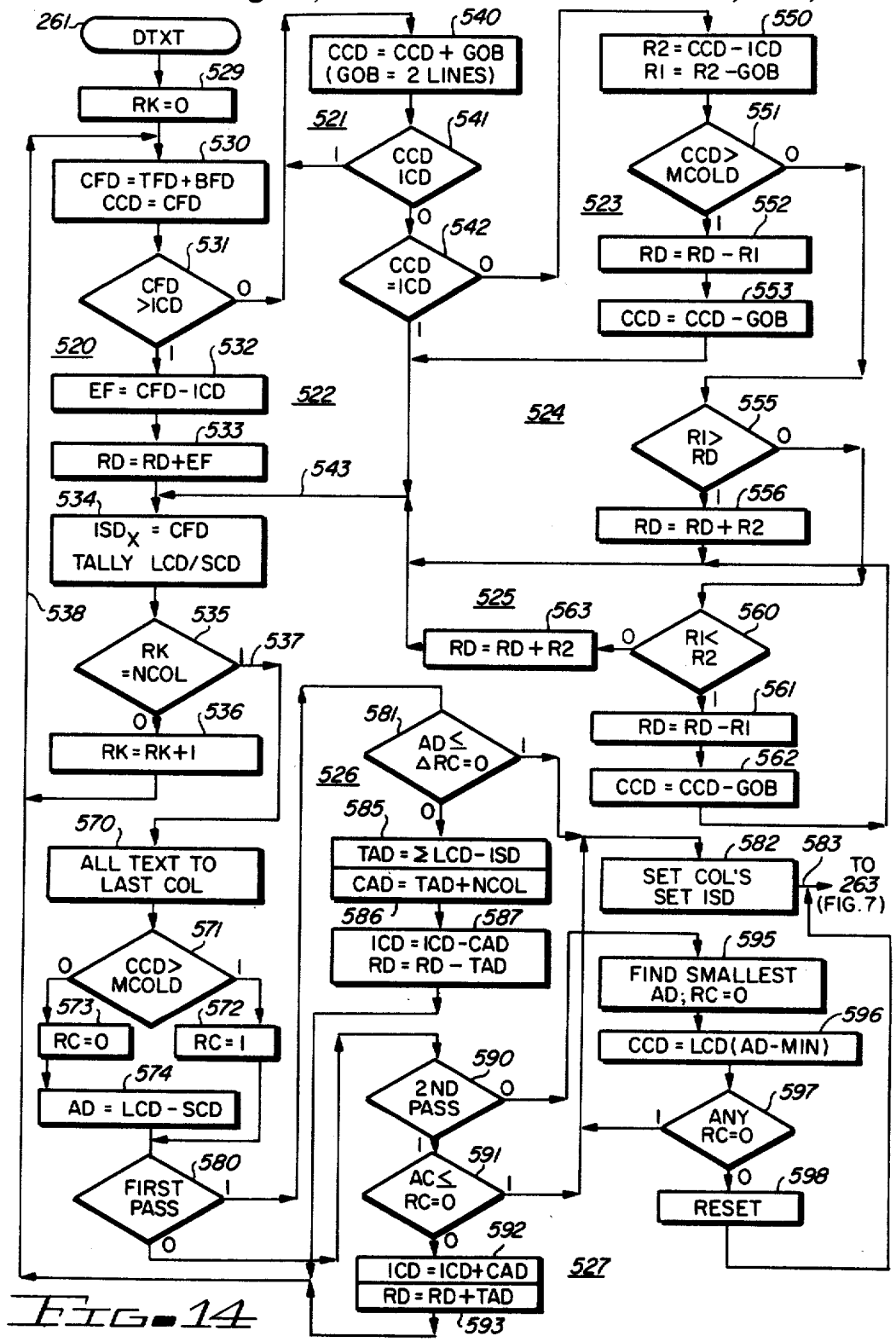

FIG. 12 illustrates the calibrate step initiated at step 260 of FIG. 7 for the recursive or iterative text distribution to be initiated at step 261. At step 435 the vertical incremental adjustment value for text distribution is determined. This incremental value is the first nonzero value for the increment of a GOB increment, GOB line space or a GOB depth. This incremental value is determined from the first GOB attached to the first galley such as GOB 87 of FIG. 5. The incremental value is determined by the MAXADJ 173 portion (FIG. 5), the line space is taken from field 171, and the GOB depth is taken from MESD 163. Then at step 436 formatter 22 calculates the TTD value to be stored at register 328 by summing the text depth of all the GOBs representing text to be distributed among the columns in the balancing set. MESD 163 in each of the GOBs contains the values being summed. Next the number of increments to be used for text distribution is calculated at step 437. This calculation is merely the value stored in TTD 328 divided by the vertical increment calculated at step 435. Storage of the vertical increment is in a workspace (not shown) of processor 13. Then at step 438 the number of increments for the columns is calculated as the dividend of the number of increments calculated at step 437 divided by the NCOL value in register 321. The number of increments for the columns is a temporary value. Then at step 439 the initial column depth to be stored in ICD 311 is calculated as a product of the number of line increments in a column times the incremental value determined at step 435. This value of ICD is the optimum or average value. The remaining depth to be justified is then calculated at step 440 as the difference between the product of ICD times NCOL minus the total text depth TTD. RDEPTH (also referred to as RD) is stored in register 365. Then at step 441 the maximum column depth MCOLD is made equal to MAXSD 310 and stored in register MCOLD 364. This process completes the calibration for determining the initial column depth prior to text distribution. Note that ICD calculated at step 439 must be greater than LFD value contained in step 337; the greater of the two is used. Upon completing calibration, the actual text distribution is initiated as at step 261 of FIG. 7. FIG. 13 illustrates a recursive type of repetitive text distribution for balancing the depths of columns while FIG. 14 illustrates an iterative process of repetitive text distribution for balancing the column depths.

FIG. 13 illustrates the recursive text distribution process for balancing columns within a set of balanceable columns. The value for initial column depth is set to a minimal value which can be selected in accordance with the column depth calculated in the FIG. 12 illustrated set of machine operations or which can be selected as being the value TTD calculated at step 436 divided by the value in NCOL 321. It should be noted that the value TTD divided by NCOL generally will be less than the ICD value calculated in accordance with the machine operations shown in FIG. 12. In any event, initial column depth stored in register 311 is used in connection with this recursive processing. The intracolumn text distribution processing includes steps 493 through 497. At step 493 NGOB 151 (FIG. 5) is examined. If NGOB 151 indicates an end of the chain (equals zero), of course no further intracolumn processing is then possible. Assuming that NGOB 151 of the GOB being examined does not equal zero, then at step 495 the current column depth value in register 315 is adjusted by taking the previous value CCD and adding the GOB and galley depths as contained in MESD 163. Then at step 497 the value stored in CCD 315 is compared with the ICD value stored in register 311. If the values are not yet equal, the next GOB is then read at step 496 and the process repeated until the last GOB has been factored into the text distribution or the current column depth is equal to or greater than the initial column depth, all at step 497.

Columnar text distribution postprocessing begins at step 500 wherein the section depth value stored in SCD 314 is compared with the current column depth value in CCD 315. If the value of CCD is less than the value of SCD, then at step 501 the value stored in SCD 314 is made equal to the CCD value such that the section depth is always equal to the longest current column depth during recursive processing. Otherwise, SCD is not altered. Then at step 502, formatter 22 compares the value stored in LCD 313 with the value stored in CCD 315, and if the new value of CCD is greater than the value of LCD, then LCD is made equal to the value of CCD at step 503. Following this action, at step 504 a rechaining flag 376 is checked. If rechaining is indicated, the text distribution is complete and a later-referred-to SET CHAIN process is instituted. Otherwise, at step 505 the value stored in NCOL 321 is compared with the value stored in RK 320 to determine if the number of columns processed is equal to the number of columns in the balanceable set. If not, at step 506 formatter 22 resets CCD 315 equal to zero in preparation for distributing text to the next column. Then at step 507, RK is incremented by unity and the next column is accessed via the pointer stored in NGLY 126, i.e. each column has its own galley. Then at step 508 certain other preprocessing may occur not pertinent to the present description. Then via junction point 492 the intracolumn processing of steps 493 to 497 is repeated.

When all of the columns have been processed as indicated at step 505 by RK equaling NCOL, then at step 509 formatter 22 compares LCD 313 with MAXSD 310 to determine if a column reached a value greater than the maximum permitted section depth. In step 510 the difference between LCD 313 and SCD 314 is compared. If the difference between the longest and shortest column depths is one line space or less as measured in step 439, then at step 516 the rechaining flag 376 is set equal to zero, the last pass flag 322 is reset to zero and the text distribution is accepted by returning to the FIG. 7 illustrated machine operations at step 517 for initiating later-described step 262. If either of the above-described conditions with respect to steps 509 and 510 are not met, then at step 511 the initial column depth ICD 311 has its value increased by the value of the line space, thereby increasing the common column depth for the next text distribution pass. At step 512, the new ICD is compared with MAXSD 310. If the new ICD is greater than MAXSD 310, then further distribution of increasing column depths will be futile, as the maximum common depth has been reached. Accordingly, at step 513, the GOBs and galleys are rechained into a final form in accordance with the shortest column depth as recorded in register 316 in execution of step 499 which set the corresponding register 316 equal to the calculated CCD. The value RK 320 determines which of the registers 316 received the calculated column depth in each recursion. The chain is set to the ICD yielding the least difference between LCD and SCD.

If, at step 512, the new calculated value of ICD 311 is not greater than the MAXSD, then at step 514 the value of RK 320 is compared with NCOL 321. If RK is equal to NCOL 321 (all columns have been processed), then the chain is set at step 513. Otherwise, all of the text is moved to the left-most column at step 515 as described with respect to FIG. 10 such that the next recursive text distribution can proceed from a single column to multiple columns. Then, the intracolumn distribution steps 493–497 are executed until a satisfactory recursive distribution occurs or until a maximum number of recursions, such as determined at step 514, has occurred. The decision at step 514 can be adjusted downwardly through normal programming design to three recursions (or another number related to the number of columns in the balanceable set, as may be desired).

The iterative text distribution to the columns in the balanceable set is described in detail with respect to FIG. 14. This iterative distribution requires ICD to be optimal, i.e. such as the ICD calculated in the calibration step 260 (FIG. 7) such as described with respect to FIG. 12. The iterative text distribution is described in terms of eight loops of machine operations. The first loop 520 is an intracolumn distribution of text. Loop 521 is a subloop within loop 520 which adds GOB depths to the column depth. Subloop 522 is entered from subloop 521 and forms an exit point for the intracolumn text distribution. Subloop 523 provides certain corrections when the ICD and column depth resulting from the intracolumn text distribution are unequal. Subloop 524 is entered from loop 523 when the column depth is less than the initial column depth. Subloop 525 provides calculations of the remaining text depth to be distributed among the columns. Loop 526 provides an exit loop for selecting the best value of text distribution of the iterative processing, while loop 527 saves the original initial column depths resulting in an unsatisfactory text distribution.

The beginning of the machine operations shown in FIG. 14 occurs at step 261 of FIG. 7. First, at step 529 RK is set to zero. Loop 520 is entered at step 530 in which the column float depth in register 361 is made equal to the summation of the top float depth in TFD 362 plus the value of the bottom float depth in BFD 363 for the column being processed. In registers 361-363, each column has a separate addressable portion for the respective float depths. The float depths may be zero. At step 531, formatter 22 compares CFD 361 with ICD 311. If the column float depth CFD is greater than the initial column depth, then ICD is too small, i.e. the minimum common depth for all columns in the balanceable set cannot be less than the maximum float depth of any one of the columns. Accordingly, the excess float depth EF at step 532 is calculated by subtracting ICD 311 value from the CFD 361 value. Then at step 533 the remaining depth RD in register 365 is increased by the value calculated at step 532. Another iteration now must be initiated. First, at step 534 formatter 22 accesses registers 350 to make the initial section depth for the iteration equal to CFD as calculated at step 530 and stored in register 361. This makes the column depth of the current columns a minimal value. LCD 313 and SCD 314 are adjusted accordingly. Then at step 535 the number of iterations RK in register 320 is compared with NCOL. If the two values are equal, then certain functions are performed as later described. Otherwise, RK is incremented at step 536 to start the next iteration. In a preferred form of the invention, RK is compared with the value of 3 as opposed to number of columns. This allows for one text distribution at the optimum ICD calculated as shown in the machine operations of FIG. 12, one iteration at a shorter initial column depth and one iteration at a longer column depth. In any event, after step 536 logic path 538 is followed to perform the same machine operations for the next column as defined by the RK value and as located by reading NGLY 126 of the current galley as recorded in GLYN 323. At this time, GLYN is updated to reflect the new iteration by transferring the contents of the current galley NGLY field to GLYN 323.

Returning to step 531, if the column float depth in CFD 361 is not greater than the value in ICD 311, then loop 521 is performed. At step 540 the current column depth CCD 315 is incremented by the next GOB depth as indicated in MESD 163 of the current GOB. Then at step 541, the value in CCD 315 is compared with the value in ICD 311. If CCD is still less than initial column depth, then step 540 is repeated for the next GOB in the chain of GOBs. When CCD no longer is less than ICD, then at step 541 formatter 22 goes to loop 522 for exiting the intracolumn text distribution. At step 542, the value of CCD 315 is compared with ICD 311. If the values are equal, then logic path 543 leads formatter 22 to previously-described steps 534 et seq. Otherwise, subloop 523 is entered by first performing step 550 which calculates interim text depth remainder values. A first interim value R2 is made equal to a difference between ICD and CCD (may be positive or negative). Then the second interim value R1 is made equal to the difference of the depth of the last GOB subtracted from the value R2. Then at step 551 the value of CCD 315 is compared with MCOLD stored in register 364. If the current column depth is greater than the maximum column depth, then at step 552 the remaining depth is reduced because CCD has to be made shorter by subtracting the value R1 from the remaining depth value stored in register 365, abbreviated as RD. Then at step 553 the value of CCD 315 is made shorter by subtracting the depth of the last GOB from the current value of CCD. Then formatter 22 follows logic path 543 to execute a machine operation beginning at step 534.

If at step 551 the current column depth was not greater than the maximum column depth, then subloop 524 is entered at step 555 by comparing the value R1 with the remaining depth value stored in register 365. If R1 is greater than the remaining depth, then at step 556 the remaining depth is increased by the value R2. That is, the instant column depth is less than the common column depth; therefore, a greater remaining depth results for subsequently-received text. If R1 is not greater than the remaining depth, than at step 560 the values of R1 and R2 are compared. If R1 is less than R2, the remaining depth at 365 is then decreased by the value of R1 and at step 562 the CCD value of register 315 is reduced by the depth of the last GOB distributed to that column. On the other hand, at step 560 if the interim value R1 is not less than the value of R2 (equal to or greater), then at step 563 the remaining depth is increased by the value R2. From steps 556, 562 or 563, logic path 543 leads formatter 22 to the previously-described machine operations in step 534 et seq.

Before proceeding further with the description of FIG. 14, the effects of the calculations with respect to values R1 and R2 on text distribution are described in detail with respect to FIG. 15. FIG. 15 shows a logical page 65. The value of TCD is the value CCD for the columnar depth before the last GOB depth was added. The value ICD corresponds to the value ICD in register 311. The GOB may have a depth extending from TCD to the value CCD, i.e. beyond the bottom of the page at 605 which corresponds to the maximum column depth MCOLD in register 364. Numeral 601 indicates the excess of GOB depth over ICD corresponding to value R2 while the space between TCD and ICD, represented respectively by lines 603 and 602, corresponds to depth R1. In this case a GOB must be taken away from the column such that the column can fit on the page or within the maximum column depth 605. On the other hand, the GOB may cause the column to extend only to an overcast of ICD represented by arrow 608 which extends from the unnumbered dashed line to the ICD line 602. When 608 represents the value R2, the column can be made longer than ICD, permitting the value R2 to be subtracted from the remaining depth in register 365 and to be added to the value of CCD in register 315.

Returning now to FIG. 14 at step 535, when the last column in the text distribution is to receive text as indicated by RK=NCOL, then formatter 22 follows logic path 537 to step 570, which then assigns all of the remaining text to the last column. At step 571, if the CCD value in register 315 calculated as a result of summing all of the depth of the remaining GOBs in step 570 is greater than the maximum column depth as contained in MCOLD 364, then the text overflows all of the columns. This results in a given nonzero return code RC, i.e. the present iterative distribution cycle has failed to contain all of the text of the columns of the balanceable set. On the other hand, if the resultant CCD in the last column is not greater than the maximum column depth, then at step 573 the return code RC is equal to zero indicating that all of the text has been contained within the columns of the balanceable set at the given ICD. Then, at step 574 formatter 22 determines the depth difference (AD) between the shortest and longest columns, which is calculated as the difference between the longest column depth LCD 313 and the shortest column depth SCD 314, as calculated for each of the respective columns at 534. The value AD is stored in the appropriate register 352 for each iteration 0 through 8, assuming that iterations are equal to the number of columns. If the iterations are limited to three, then there will be three registers 352 addressed respectively by the first, second and third passes. Then at step 580 the first pass is checked, i.e. RK 320 equals 0. (RK was reset to zero at step 529). For a first pass, at step 581 value AD calculated at step 574 is compared with the initial incremental value or line space calculated at step 435 of FIG. 12 and as stored in register 360. If the value AD is less than the incremental value, a satisfactory distribution has occurred, resulting in a return code of zero. Then at step 582 formatter 22 rechains or sets the columns in accordance with the current iterative text distribution, i.e. the first pass was a successful distribution in that the difference between the longest and shortest columns met the current criteria for a successful text distribution. Then formatter 22 follows path 583 to step 263 of FIG. 7. If the adjustable depth AD between the shortest and longest columns is not less than the incremental value at 581, formatter 22 at step 585 determines the total adjustment depth TAD for later use in calculating a new ICD. First at 585 the total adjustment depth TAD for all of the columns in the balanceable set is a summation of the column depth differences between the longest column depth of LCD 313 and all of the column depths calculated as CCD and then stored in the respective registers 350. Then the adjustment depth for the individual columns is calculated in step 586 by dividing the total adjustment depth TAD by NCOL 321. Then, at step 587 the new ICD is calculated by subtracting the value CAD from the value ICD stored in register 311. The new ICD value is then stored in register 311. Also in step 587, the remaining depth to be distributed contained in register 365 is adjusted by subtracting the total adjustment depth TAD from the remaining depth, i.e. the columns are now shorter than they were previously, which can result in an improved distribution as described earlier with respect to FIG. 6. Formatter 22 then follows logic path 538 to repeat the text distribution cycle or pass.

For second and third text distribution passes, formatter 22 from step 580 goes to steps 590 et seq. for providing other adjustments. If at step 590 it is the second text distribution pass (the shortest ICD in the iterative process of three iterations), then at 591 the adjustment depth calculated at 574 is compared with the incremental value. If the result of the second iteration provides an adjustment depth less than or equal to the incremental value, then a satisfactory text distribution has been completed and the columns are set at step 582, as previously described. If not, an additional iteration is required. This iteration is prepared at step 592 by increasing the initial column depth ICD 311 by the value CAD calculated at step 586. Since the total column depth is greater for all of the columns, then at step 593 the remaining depth RD in step 365 is increased by the value of TAD, the total adjustment depth. Then a third text distribution pass or cycle follows. The result of the third text distribution pass to the columns finds formatter 22 executing steps 580 and 590, then proceeding to step 595 to find the smallest adjustment depth value stored in registers 350 that has a return code of zero (valid distribution). This action requires scanning the three registers 350 and finding the smallest adjustment deth. At step 596 the CCD value in register 315 is made equal to the LCD 313 value of the appropriate iteration (the value AD calculated in the respective step 574 is at a minimum). Then at step 597 formatter 22 looks for any RC value equaling zero as stored in the respective register 350. If not, then the set of balanceable columns cannot be reasonably balanced in accordance with the criteria set forth above. Accordingly, at step 598 the text distribution is reset to the initial chaining without exceeding the maximum column depth MCOLD 364. For any RC equal to zero which indicates an improved distribution of text for text balance between the columns, the columns are set at 582 to the CCD value calculated at 596. Then step 263 of FIG. 7 follow.

Referring next to FIG. 16, machine operations of formatter 22 initiated by step 263 of FIG. 7 relating to checking the footnote balancing for justification purposes as well as measuring the deepest or longest column are detailed. First the footnotes are checked at steps 63 to determine whether or not a footnote was involved in the justifiable set of columns. If not done before this time, all of the gallays 83, 85, 86 are checked for FN flags 133. In this regard all of the galleys can be made the same length such that the footnote flag FN will always have the same offsets in the galley. Accordingly, the scan is relatively quick. If none of the galleys indicate there is a footnote gally, there is no footnote in the justifiable set of columns. Accordingly, steps 631-633 are omitted with formatter 22 proceeding directly to logic path 634 for finding the deepest columns. For a footnote being indicated at step 630, steps 642-648 are executed whether or not there is a callout in any GOB to which the footnote is attached. As background to the processing, a column galley attaching a footnote galley has intermediate GOBs 87 representing text within the column. The footnote galley 83 is attached to a GOB having a FN flag 158 which indicates that the text or graphics stored with the GOB includes a footnote callout. If there is no footnote callout in the column to which the footnote is attached, then the footnote need not be considered with respect to vertical justification of the columns; accordingly, from step 631 logic path 634 is directly entered. With a footnote attached to a column and a callout in the column, at step 632 data storage space within the work space of main memory (not shown) of computer 13 allocated to formatter 22 for a GOB data structure is allocated (set GOB). This GOB will act as a callout for the footnote during the justification process, to make it more easily and separately identifiable during the justification process. Then at step 633 this intermediate or dummy GOB set up at step 632 is chained to the last GOB of the column having the footnote callout. The above procedure occurs for each and every column having a callout for a footnote and can occur several times in a given column when there is a plurality of footnote callouts. The machine operation looping for handling such a plurality of callouts is easily established and dispensed with for purposes of simplicity.

Finding the deepest column begins at step 640 wherein formatter 22 examines NCOL 321 to see if there is a plurality of columns in the section. If there is none, then the return is taken to the FIG. 7 illustrated machine operations at step 649. In an alternative process, the galleys for the section can be scanned as above described looking for flags, C1 and J1 of flag 133 to determine if vertical justification is to be performed on the columns. In any event, at step 640 formatter 22 determines that there are a number of columns. At step 642 a loop control is set on incrementing X (a counter not shown within a work area of formatter 22). The value of X is assumed to be initialized to zero; adding one to X at step 642 indicates the first column in the set of columns which is found by scanning the section galleys. At step 643, the first GOB indicated by FGOB 131 of the galley 83 (FIG. 5) is examined. If FGOB 131 points to an area having no data or which is zero, then at step 644 formatter 22 determines that because there is no GOB there is no column, i.e. the column is empty. Then logic path 647 is followed to later-described step 646. If there is a GOB at step 644 (NO GOB=0), then at step 645 the GOBs in the column are scanned to see if they are all skips. If the column contains nothing but skips, then step 646 is also entered directly. Otherwise, at step 641 the column depth is measured by summing the depths of all of the vertical elements, such as text, skips, spaces. Then at step 646 the floats are measured which includes those float in columns having no other text material. Then at step 648 the value X is compared with the value NCOL stored in register 321. When X is less than NCOL, then at step 635 X is incremented by one. Steps 641 through 648 are repeated until all of the columns have been processed. The results of the column measurements are stored in MESD 355 as a part of steps 641 and 646. Then formatter 22 returns to the machine operations shown in FIG. 7. Steps 264, 265 of FIG. 7 lead formatter 22 to the operations detailed in FIG. 17. Now that footnotes have been handled (FIG. 16) and column depths have been set, then as shown in FIG. 17, ISD is set as initiated by step 266 of FIG. 7 by scanning each column galley and accumulating minimum and maximum depths per set of justifiable columns. This action is achieved by finding the first galley at step 650 and then taking at step 651 the accumulated minimum and maximum skip depths, minimum and maximum space depths and minimum and maximum text depths, as well as the total lead-out depths as accumulated by steps 651 and 652 of FIG. 17. These actions are shown as steps 651, 652 and 653 of FIG. 17. MAXLO of step 653 is the maximum lead-out depth addable to a column. The MAXLO value is stored in register 367. In any event, at step 654 formatter 22 calculates the total column depth COLTD and stores same in register 327 for each of the columns to be justified. Each total column depth COLTD has minimum and maximum depth totals. At step 655 whether or not the last column has been summed as above described is checked using the X and X+1 counter described earlier with respect to FIG. 16. The next galley is found at step 656 by reading the pointer NGLY 126 of the present galley. Then at step 651 the X value is incremented. The loop 651–657 repeats until the minimum and maximum depths of the last column have been summed. Then at step 670 initial section depth ISD is set to the total column depth value stored in COLTD 327 divided by the number of columns NCOL and then rounded to the next greater line space increment. Then at step 671 the total column depth TCD of value stored in register 340 is set equal to the product value of NCOL stored in register 321 times the calculated ISD stored in register 312. Then at step 672 the expansion column depth ECD is set in register 353 as equal to the value TCD stored in register 340 less the total column depth COLTD. At step 673 the value ECD taken in line space increments is compared with NCOL 321 to ascertain whether the justifiable depth differences between the columns is less than one line space per column. If not, detailed justification follows. Otherwise at step 674 the initial section depth of columns 0 through 8 is made equal to ISD 312. At step 675 the counter value X is made equal to the number of columns NCOL. Then within loop 676 the ISD of the rightmost columns is made equal to one line space greater than the leftmost column ISD. At step 677 the ISD of the Xth column is made one line space less than the value of ISD stored in regular 312 and recorded in the appropriate register 351. For each column, ECD in register 353 is decremented by one line space. At step 678 the value of ECD is compared with zero. If it is zero, the FIG. 7 illustrated machine operations are returned to. Otherwise, at step 679 value X is decremented and the loop repeated until ECD=0.

Subsequent to the above-described text distribution cycling for balancing the depths of the columns in a balanceable set and the subsequent footnote checking and setting a section depth for the columns, the initial section depth now corresponds to the selected column depths of either text distribution as shown in FIGS. 13 and 14. The first step is to determine whether or not the selected initial section depth set up by the FIGS. 16 and 17 operations and stored in register 312 can be justified using the later-described vertical justification procedures. This check is shown in FIG. 18. For each column, at step 610, a minimum total column depth MINTOT is calculated as the summation of the total text depth (TX), skip depth (SK), space depth (SP) less the product of the compression ratio stored in register 326 times the respective vertical depths of the TX, SK and SP elements within the column. This figure MINTOT for each column is the shortest possible column depth for enabling vertical justification to succeed. The longest MINTOT of all of the columns within the justifiable column set is selected and stored in register 347. In a similar manner, maximum total depth of each column, MAXTOT, is determined by summing the present vertical depths of all of the text, skips and spaces plus the lead-outs; then adding to that sum the product of the expansion ratios for each of the variables (TX, SK, SP) plus maximum lead-out depths as stored in register 326 and the present respective vertical depths. The shortest MAXTOT length is selected for storage in register 348. The longest MINTOT and the shortest MAXTOT define the limits of vertical justification for the columns in the justifiable set of columns. In this regard, the justifiable set of columns will be equal to the balanceable set used in text distribution, no limitation thereto intended.

Verification of the ISD value in 312 with respect to the limits calculated above is determined by a formatter 22 at step 611. Here the value in ISD 312 is compared with MINTOT to see if it is not less than the value stored in register 347 and is not greater than the value stored in MAXTOT register 348. If ISD falls within the limits, then at 612 formatter 22 returns to the FIG. 7 illustrated machine operations chart for proceeding to step 268 for executing VJUST, as described with respect to FIG. 19.

When the ISD value at step 611 is outside the limits of MINTOT and MAXTOT, then formatter 22 in steps 613 to 623 takes corrective action. At steps 613 the value in ISD 312 is transferred to a work register (not shown) as a "SAVE ISD". At step 614, register NCOLF 346 is made equal to the value Y which was stored in NCOL 321 earlier. Then at step 620 the initial section depth in register 312 is made equal to MAXTOT for the column X which has a depth next to the shortest MAXTOT. This selection is checked at 621 by formatter 22, which repeats the compare function described for step 611. If the ISD calculated at step 620 falls within the limits MINTOT and MAXTOT, then at step 623, ISD 312 is made equal to the ISD calculated at step 620 less the minimum adjustment, i.e. one line space. Then formatter 22 returns to the FIG. 7 illustrated machine operations via return 612. On the other hand if the ISD calculated at step 620 is still outside the limits MAXTOT and MINTOT, then at step 622 the value X, i.e. the number of the columns used in step 620 calculation, is compared with the value in NCOLF 346. If they are not equal, then the number of columns in the justifiable set is reduced by one at step 624 and the steps repeated until a justifiable set of columns is defined which is less than the number of columns in the balanceable set. It should be noted in this regard that this correction procedure accommodates vertical justification of columns that have not been distributed in accordance with the machine operations shown in FIGS. 13 and 14 or in the event the keeps and floats prevented a satisfactory text distribution. In other words the correction step provides for vertical justification in a limited number of columns in an attempt to provide the best aesthetics to the columns. When value X equals the NCOLF value, return is then taken to the FIG. 7 illustrated machine operations; otherwise machine operations now proceed to step 268 which are detailed in FIG. 19.

Figure 20:
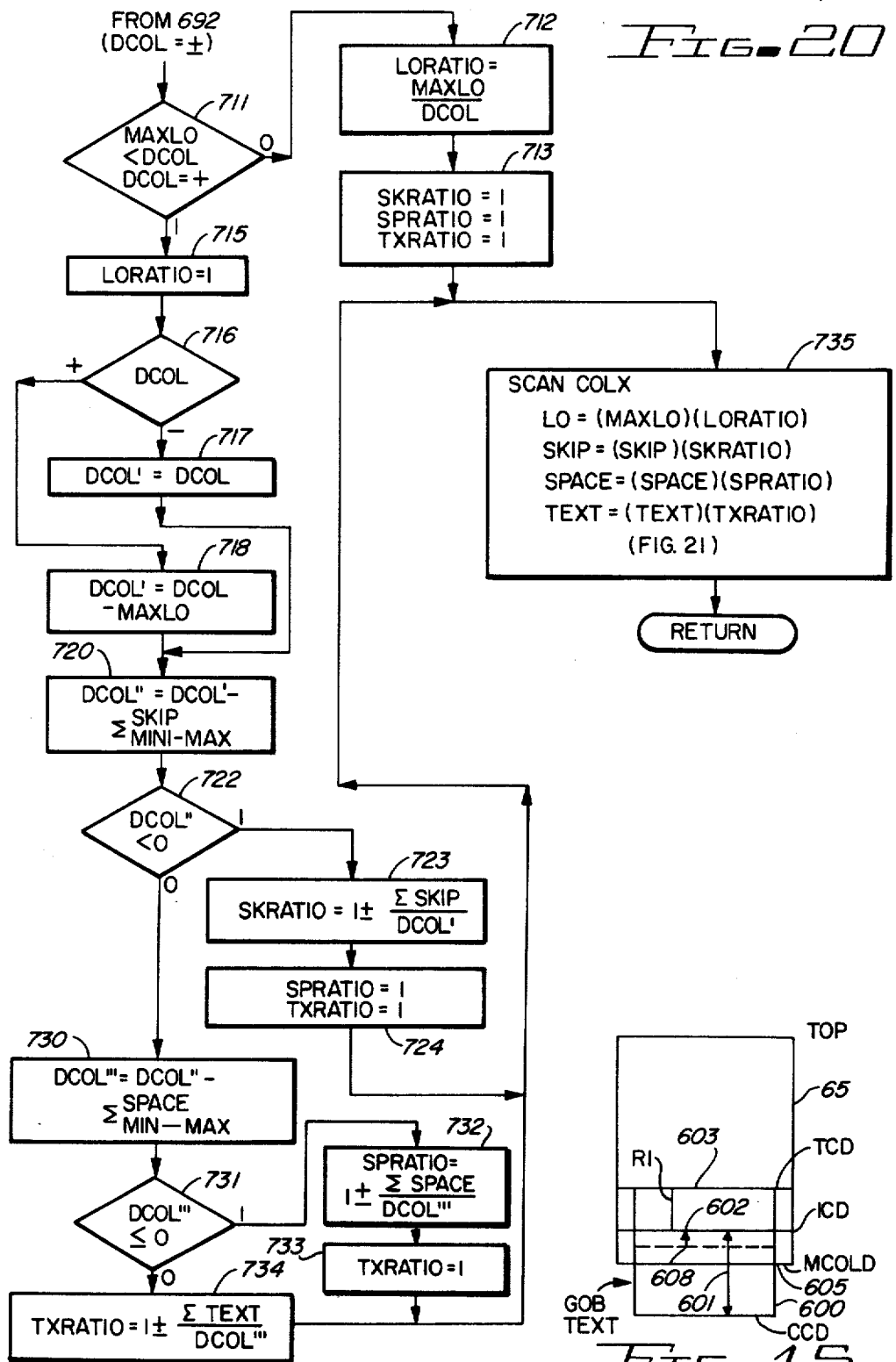
Figure 21:
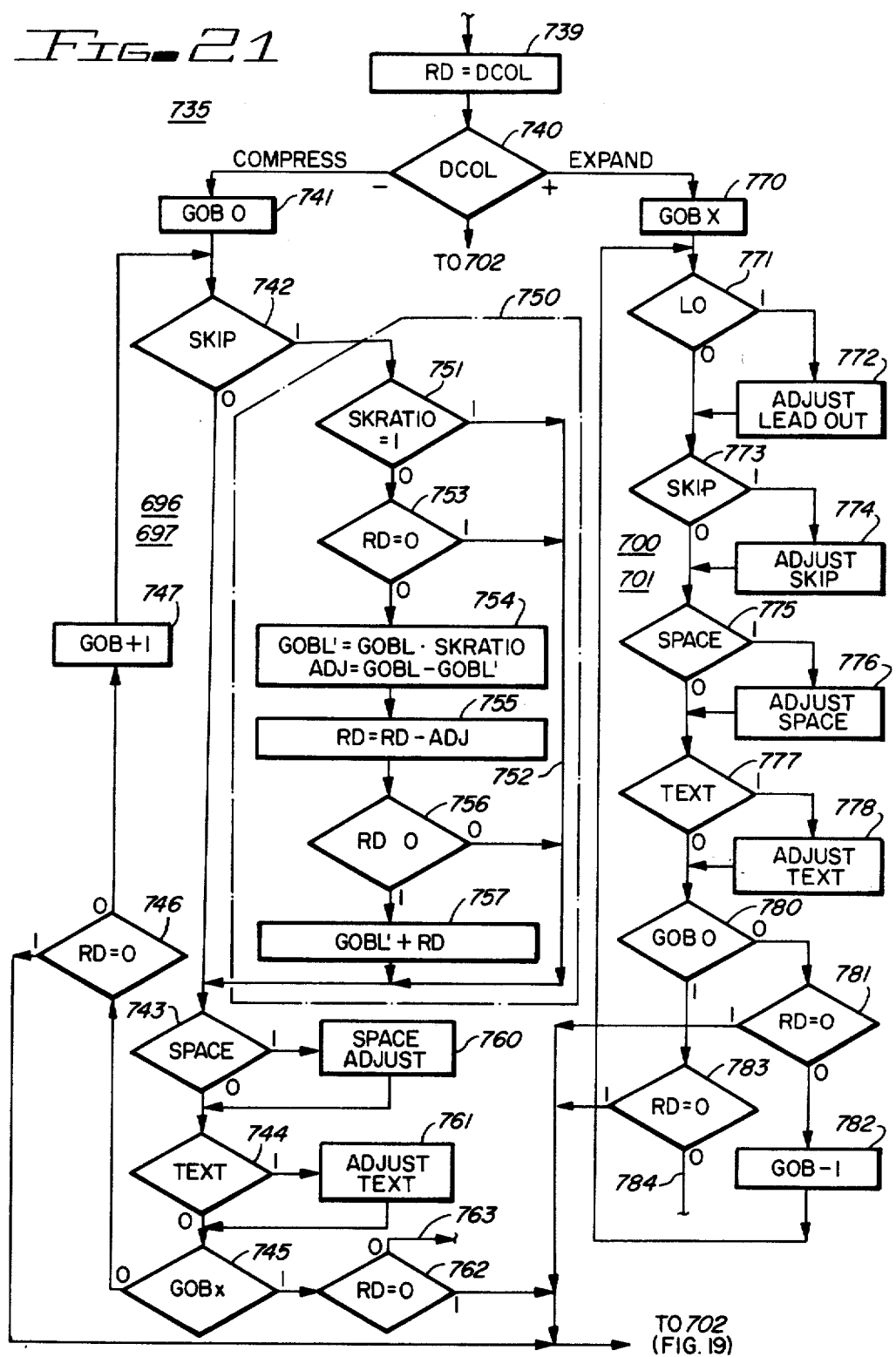

The actual vertical justification process is detailed in FIGS. 19-21. The vertical justification includes the basic steps of expanding or compressing each column to the ISD using, in the order of selection: lead-outs (expansion only), skips, spaces and text vertical areas. For the preferred procedure of FIG. 14 and in FIG. 13 for the alternate procedure, line spacing depth of each GOB-represented vertical area (text, space or skip) is set to vertical length value VLVAL, which is equal to the product of the number of increments NUM I times the incremental value; the remaining depth is calculated, and the GOB and galley depths are adjusted accordingly. FIG. 19 shows the overall flow. Vertical justification is initiated at step 267 of FIG. 7. In FIG. 19, at step 690 the X counter 384 is set to zero for pointing to the leftmost column. At step 691, for the current column, the value DCOL 345 is made equal to the difference of the ISD and the MESD values respectively stored in the appropriate registers 351 and 355. DCOL indicates the vertical justification depth to be accommodated. At step 692 DCOL values are evaluated. IF DCOL equals zero, then logic path 693 leads formatter 22 to process the next column, as later described; no vertical justification is required for the current column. If DCOL for the instant column is negative, then MESD for the column is greater than its ISD; hence the column has to be compressed or shortened. Accordingly at step 695, as will become apparent, DCOL', a new value of the remaining depth, is made equal to the initial differential depth. Then at steps 696 and 697 the column is compressed as described with respect to FIG. 20. As indicated at step 697, the compression starts at the top of the column and proceeds toward the bottom such that the top of the text will tend to be more vertically dense than the bottom.

IF DCOL has a positive value, then the column has to be expanded-ISD is greater than MESD. Accordingly, at steps 700 and 701, the column depth is increased by expanding the vertical areas as explained with respect to FIG. 20. Expansion, beginning at the bottom of the column, proceeds toward the top of the column as indicated at step 701. This action tends to make the top of the column more dense than the bottom of the column, such that all of the columns whether compressed or expanded, will have the same relative vertical changes in text density. Then at step 702 the value of X is incremented to indicate the next column should be processed. Then at steps 703 the value of X is compared with the value of NCOL 321 plus unity to determine if all of the columns have been vertically justified.

The actual vertical adjustment of a column is detailed by FIGS. 20 and 21. Before the column expansion or compression occurs, the ratios have to be adjusted for obtaining proportional adjustment within the vertically justified columnar elements. Accordingly from step 692 of FIG. 19 when DCOL is nonzero (positive or negative) the ratios are first set; then the compression or expansion actually occurs in each of the respective columns. In FIG. 20, at step 711 MAXLO in register 367 is compared with DCOL of register 345. If MAXLO is greater than DCOL, then for expansion (DCOL=plus) the lead-outs merely need to be used for vertically justifying the column. Hence, the skips, spaces and text need not be adjusted. Lead-outs, of course, do not apply to compressing columns. Accordingly, for a column expansion and where the lead-outs can accommodate the vertical justification, formatter 22 at step 712 sets the lead-out ratio LORATIO of register 385 equal to the quotient of MAXLO contained in register 367 divided by DCOL of register 345. The skip, space, and text ratios respectively in registers 386, 387 and 388 are set to unity at step 713, i.e. the skips, spaces, and text are not vertically adjusted.

At step 711 for compression or when MAXLO is less than DCOL, the lead-out ratio LORATIO of register 385 is set to unity at step 715. At step 716 for DCOL being negative (compression), the value of DCOL' is made equal to DCOL at step 717 (corresponding to step 695 of FIG. 19). Since the lead-outs are zero, they cannot be compressed; therefore, the first remaining adjustment depth DCOL' of the column after the lead-out adjustments is equal to the initial adjustment. For column vertical expansion, at step 718 the first remaining adjustment depth DCOL' is made equal to the difference between DCOL of register 345 and MAXLO of steps 367 and is stored in register 390, i.e. the maximum lead-out adjustment is provided for expansion as a priority of vertical justification. Then at step 720 the second remaining adjustment difference DCOL" of register 391 is made equal to the sum or difference of DCOL' and the summation of all of the skip adjustments for either a minimum value (compression) or a maximum value (expansion). The algebraic sign of the DCOL value (plus or minus) determines which is calculated in accordance with steps 716-718.

Then at step 722 the value of DCOL" of register 391 is compared with zero. IF DCOL" is less than zero, this means the maximum adjustment allowed through the ratios for either compression or expansion has overadjusted the column depth. Therefore, the ratios must be set from the maximum values indicated in register 326. Accordingly, at step 723 the skip ratio SKRATIO of register 386 is made equal to unity plus or minus the summation of the skips divided by DCOL'. The negative value is for vertical compression and the additive value is for vertical expansion. Such adjusted ratio values provide proportional vertical adjustment at less than the maximum allowed under the ratios preset into register 326. At step 724 the space and text adjustment ratios of registers 387 and 388 are set to unity for providing no adjustment whatsoever for those vertical areas within the column. Accordingly, lead-outs (for expansion only) and the skips provide complete vertical justification of the current column to the ISD.

When the skip and lead-out adjustments do not provide for complete justification of the column depth to the ISD, then at step 730 a third remaining adjustment DCOL''' of register 397 is calculated which is equal to the difference of DCOL" less the minimum and maximum space adjustments as previously summed for the current column. The minimum value is for vertical compression and the maximum value is for vertical expansion, as described earlier with respect to steps 716-718. At step 731 the value DCOL''' is compared with zero. If DCOL''' is less than zero then the column has not been overadjusted and the space ratio SPRATIO may be calculated as less than the maximum adjustment ratio. At step 732 formatter 22 calculates the new SPRATIO for use in adjusting the current column by adding (for expansion) or subtracting (for compression), to or from unity, the quotient of the summation of the total space adjustments divided by DCO''' and storing same in SPRATIO 387. When DCOL''' equals zero, of course, the SPRATIO calculated at step 732 will be the actual maximal ratio. At 733 formatter 22 sets TXRATIO register 388 to unity as all of the vertical adjustments can be achieved without adjusting the actual text vertical areas. When DCOL''' is greater than zero, formatter 22 at step 734 calculates the TXRATIO for register 388 by adding or subtracting the quotient of the summation of the text adjustment divided by DCOL''' to or from unity, subtracting for compression and adding for expansion, to obtain the appropriate text vertical adjustment ratio for completing the proportional vertical justification.

From steps 713, 724, 733 or 734, formatter 22 then actually does the vertical adjustments at step 735 as detailed in FIG. 21. Such procedure includes scanning the galleys and GOBs and adjusting all lead-outs by multiplying the MAXLO value for the lead-out GOBs times the LORATIO of register 385. In a similar manner skip, space, and text vertical adjustment distances are all adjusted by the previously described calculated ratios of adjustment. This action allows one pass through all of the galleys and GOBs for providing vertical justification. One pass of all the galleys and GOBs is required for completing steps 711–734 and a second pass for step 735.

The actual vertical justification process of step 735 as detailed in FIG. 21 begins at step 739 wherein the remaining depth register 365 (not used for other purposes during vertical justification) is set to the value of DCOL of register 345 for the appropriate column for tracking the vertical adjustment with respect to a maximal adjustment depth of that column. At step 740 the sign value of DCOL (plus or minus or zero) is checked. For DCOL equaling zero, step 702 of FIG. 19 is directly entered.

For DCOL being negative, a compression operation occurs for vertical justification. It will be remembered that in steps 696 and 697 of FIG. 19 compression began at the top of the column and proceeded down the column. Accordingly, at step 741 GOB 0 identified in the column galley at FGOB 131 is set with GOBN 324 being made equal to NGOB 151 of GOB 0. Then the priority of compression adjustment follows in steps 696, 697. At step 742, the SK flag 158 of the GOB is examined. If it is not a skip (SK=0) then at step 743 whether the GOB is a space is determined. If the flag 158 SP=0 (GOB is not a space), then at step 744 whether the GOB has text is examined. If TX=0, then the next GOB is accessed for vertically adjusting its represented text and graphics or vertical space. With respect to steps 742–744, for any of the skips, spaces or text, vertical compression occurs as will be later described. After the GOB depth is appropriately vertically adjusted, formatter 22 at step 745 examines to see if the present GOB is the last GOB in the chain by examining NGOB 151. If NGOB 151 shows end of the chain, the end of column processing occurs; otherwise, at step 746 formatter 22 compares the value of RD in register 365 with zero to see if all of the appropriate vertical justification has been completed. If so, postcolumns processing (steps 702 et seq. of FIG. 19) ensues. Otherwise at step 747 formatter 22 accesses the next GOB (GOB+1) as indicated at GOBN 324 and updates GOBN 324 to the following GOB. Then steps 742–745 are repeated until the end of the column.

For an adjustment at the skip priority level, steps 750 et seq. show how the compression adjustment is achieved. At step 751 SKRATIO 386 is examined. If that ratio is equal to unity, then the skip should not be adjusted. Accordingly, formatter 22 follows path 752 to step 743. It should be noted that in register 326 the skip ratio may be limited to unity, thereby preadjusting the priorities of vertical justification. At step 753 the value of RD in register 365 is compared with zero. If it is zero, no further vertical adjustment is required. Otherwise, at step 754 the GOB depth from MESD 163 is adjusted by multiplying the value from MESD (GOBL) by SKRATIO of register 386 to obtain the GOB length GOBL'. GOBL' is then loaded into MESD 163 of the GOB 87. The adjustment value ADJ is also calculated to be equal to the difference between the old and new GOB depths. Then at step 755 the value stored in RD 365 is reduced by the value ADJ keep a running total of the remaining depth to be compressed within the current column. At step 756 the value RD is compared with zero. If RD is less than zero, an overadjustment has occurred. The overadjustment is compensated for at step 757 by adding the remaining value RD into GOBL' and storing same in MESD 163 of the current GOB.

The space and text adjustments proceed in the same manner as described for the skip adjustment, i.e. the same procedures are used except different respective ratios are employed. Accordingly, steps 760 and 761 with respect to the adjustment of spaces and text in the space and text GOBs are identical to the series of steps 750.

When formatter 22 at step 745 finds that all of the GOBs in the current column have been scanned, at step 762 it compares the value RD in register 365 with zero. If it is not zero, further error recovery and accommodation processing beyond the scope of the present description are required as formatter 22 follows logic path 763. Otherwise, from step 762 or from step 746, step 702 of FIG. 19 is entered.

When the column is to be expanded from a present depth to the ISD value stored in the appropriate register 351, expansion occurs from the bottom of the column to the top. Accordingly, at step 770 formatter 22 from the column galley examines field LGOB 132 to identify the last GOB in the chain of GOBs which represents the last or bottom text or graphic or other vertical area in the column. The procedure is identical to step 741 except that, in the scan of the columns, PGOB 152 is used to make GOBN 324 indicate and store the next GOB to be examined. Each GOB is examined as described for the compression procedure. The GOB flags 158 are examined respectively at steps 771, 773, 775 and 777 for a lead-out, skip, space and text for any GOB corresponding to those typographic elements. There is a corresponding vertical space adjustment in steps 772, 774, 776 and 778. The adjustment procedure is the same as that described in the series of steps 750 except, of course, the vertical adjustment ratio is greater than one rather than less than one; in all other respects the procedures are identical except that the next GOB is one closer to the top of the column rather than closer to the bottom of the column. At step 780 formatter 22 examines the GOB to see if it is the last GOB to be processed, i.e. GOB 0 or the top of the column. If not, at step 781 the value in RD 365 is compared with zero. If it is non-zero, further vertical adjustment is required and the next GOB is accessed at step 782 (GOB−1) as described for step 747 except for the direction of access, i.e. PGOB 152 is read rather than NGOB 151. Then steps 771–780 are repeated. If at step 781 RD is equal to zero, the column has been fully vertically justified;

formatter 22 proceeds to step 702 of FIG. 19. If at step 780 formatter 22 finds that it has processed GOB 0, i.e. it has reached the top of the column being justified, then at step 783 the RD value stored in register 365 is compared with zero. When RD is equal to zero, the column is fully justified such that formatter 22 then proceeds to step 702 of FIG. 19. If the vertical justification did not completely justify the column, then formatter 22 follows logic path 784 for corrective and recovery action beyond the scope of the present description.

While the invention has been particularly shown and described with reference to preferred embodiments thereof, it will be understood by those skilled in the art that various changes in form and details may be made therein without departing from the spirit and scope of the invention.

What is claimed is:

1. A machine-implemented method of arranging text in a plurality of text-containing horizontally-aligned columns to balance the existing text depths of the columns by changing the column depths;

the automatic machine-executing steps of:
in a machine, automatically electrically indicating by digital signals the depths of each of the individual columns, including electrically indicating by digital signals a longest and a shortest column depth;
then in the machine, firstly, automatically selecting a common column depth intermediate said indicated longest and said indicated shortest column depths;
secondly in the machine, automatically changing the depths of all columns to said common depth by vertically expanding columns having a depth shorter than said common depth by adding nontext vertical areas intermediate predetermined text and compressing columns having a depth longer than said common depth by reducing nontext vertical areas intermediate predetermined text;
the machine automatically presenting the arranged text in a visual form; and
firstly in the machine, automatically adding said vertical areas in lower end portion of said shorter columns and compressing said longer columns by reducing said vertical areas in an upper end portion of said longer columns and secondly adjusting said columns, if required, in other vertical portions thereof to achieve vertical justification whereby density of graphics are similar between columns at given vertical locations in such columns.

2. A machine-implemented method of arranging text in a plurality of text-containing horizontally-aligned columns to balance the existing text depths of the columns by changing the column depths;

the automatic machine-executing steps of:
in a machine, automatically electrically indicating by digital signals the depths of each of the individual columns, including electrically indicating by digital signals a longest and a shortest column depth;
then in the machine, firstly, automatically selecting a common column depth intermediate said indicated longest and said indicated shortest column depths;
secondly in the machine, automatically changing the depths of all columns to said common depth by vertically expanding columns having a depth shorter than said common depth by adding nontext vertical areas intermediate predetermined text and compressing columns having a depth longer than said common depth by reducing nontext vertical areas intermediate predetermined text;
the machine automatically presenting the arranged text in a visual form;
for each of said columns in the machine, automatically indicating a minimal column depth; and
in the machine, automatically doing a portion of said firstly selecting step including selecting the minimal column depth of a predetermined one of said columns to be said common depth.

3. A machine-implemented method of arranging text in a plurality of text-containing horizontally-aligned columns to balance the existing text depths of the columns by changing the column depths;

the automatic machine-executing steps of:
in a machine, automatically electrically indicating by digital signals the depths of each of the individual columns, including electrically indicating by digital signals a longest and a shortest column depth;
then in the machine, firstly, automatically selecting a common column depth intermediate said indicated longest and said indicated shortest column depths;
secondly in the machine, automatically changing the depths of all columns to said common depth by vertically expanding columns having a depth shorter than said common depth by adding nontext vertical areas intermediate predetermined text and compressing columns having a depth longer than said common depth by reducing nontext vertical areas intermediate predetermined text;
the machine automatically presenting the arranged text in a visual form; and
in the machine, automatically establishing a range of vertical adjustments for said vertical areas as a ratio of a predetermined normal area text parameter identified with text being presented, said range including a specification of one ratio for expansion and a specification of a second ratio for compression, said ratios being a predetermined maximal percentage change of said normal area parameter.

4. A machine-implemented method of arranging text in a plurality of text-containing horizontally-aligned columns to balance the existing text depths of the columns by changing the column depths;

the automatic machine-executing steps of:
in a machine, automatically electrically indicating by digital signals the depths of each of the individual columns, including electrically indicating by digital signals a longest and a shortest column depth;
then in the machine, firstly, automatically selecting a common column depth intermediate said indicated longest and said indicated shortest column depths;
secondly in the machine, automatically changing the depths of all columns to said common depth by vertically expanding columns having a depth shorter than said common depth by adding nontext vertical areas intermediate predetermined text and compressing columns having a depth longer than said common depth by reducing nontext vertical areas intermediate predetermined text;
the machine automatically presenting the arranged text in a visual form;
in the machine, automatically classifying all nontext-containing vertical areas in the columns into a plurality of classes such that each class having a priority of vertical adjustment different from other classes; and
in the machine, during said expanding and compressing steps automatically changing the vertical depths of said vertical areas in all of said columns in accordance with said priority of vertical adjustments such that vertical areas in a high priority class are adjusted in vertical depth to achieve vertical justification and that vertical areas in lower priority classes are not adjusted in vertical depth if said vertical justification is achieved by said first adjustment of said high priority class.

5. The machine-implemented method set forth in claim 4 further including the automatic machine-executing steps of:
    assigning a highest priority of vertical adjustment to that class of said nontext-containing vertical areas which is for indicating a shift in graphics informational content in a subject area;
    assigning a second highest priority of vertical adjustment to that class of said nontext-containing vertical areas which is for separating sets of plural lines of text; and
    assigning a third highest priority of vertical adjustment to that class of said nontext-containing vertical areas which is for purposes other than the purposes of the classes having the highest and second highest priority of vertical adjustment.

6. In a machine-implemented method of arranging text and graphics in a plurality of side-by-side columns to balance the existing vertical depths of the columns; the automatic machine-executing steps of:
    in an automatic machine, automatically measuring the depth of each of the individual columns;
    in the automatic machine, automatically comparing the measured depths of all said columns to indicate a difference of said measured depths between a shortest one and a longest one of said columns;
    in the automatic machine, automatically selecting a common depth for all of said columns either at the shortest depth or intermediate the depths of said measured shortest and longest columns; and
    in the automatic machine, automatically adjusting the depths of said columns toward said common depth by expanding nontext-containing vertical spaces adjacent a lower end of said columns shorter than said common depth and reducing nontext-containing vertical spaces adjacent an upper end of said columns longer than said common depth.

7. A machine-implemented method of arranging text in a plurality of side-by-side columns to balance the existing vertical depths of the columns to a given column depth; each column including vertical skip spaces, blank line spaces, interline spaces and vertical leadout spaces;
    all of said text being represented by digital signals;
    including, in an automatic machine, executing the automatic machine-implemented steps of manipulating said digital signals for:
    automatically adjusting, in said machine, the depths of said columns by first adjusting the column depths at predetermined leadouts such that said column depths are respectively closer to said given column depth, then firstly in said machine automatically changing the respective vertical depths of the line, skip and blank line spaces such that the column depth becomes closer to said given depth, automatically comparing, in said machine, the first changed depths of the columns with said given depth; if said first changed depths are not identical, then secondly automatically adjusting, in said machine, the respective vertical depths of said blank line spaces such that the column depths become closer to said given depth;
    automatically comparing, in said machine, the secondly adjusted column depths with said given depth; and
    automatically converting, in said machine, said manipulated digital signals to a visual presentation for visually presenting said text as balanced and adjusted set of columns.

8. A machine-implemented method of justifying text and graphics to a common physical dimension, including in a programmed automatically-operating machine executing the automatic machine-executing steps of:
    automatically distributing, in said machine, said text and graphics amongst a plurality of physical text- and graphics-receiving areas of a logical page so as to reduce any physical differences along said common physical dimension between said physical areas;
    automatically assigning, in said machine, adjustment ratios for limiting adjustment of predetermined physical parameters of said text and graphics as a ratio expressed as a maximal percentage change of the actual physical dimensions thereof as such text and graphics are to initially appear on the logical page, in said machine assigning an independent adjustment ratio to each of said parameters such that one ratio of each of said parameters being for compressing said text and graphics for reducing said text and graphics along said one dimension and a second ratio of each of said parameters being for expanding said text and graphics to lengthen the text and graphics along said one dimension;
    automatically length justifying, in said machine, said text and graphics along said one dimension using said ratios for said physical parameters, respectively; and
    automatically intermixing, in said machine, said adjustments for said parameters such that one or more of said parameter adjustments contribute to said length justification in accordance with said independent ratios.

9. In a document preparation system having means for receiving unformatted text data, a programmed processor coupled to said receiving means for formatting said received unformatted text data and output means coupled to said programmed processor for receiving formatted text data for visually presenting said document, said programmed processor having a control memory storing program indicia for enabling the programmed processor to automatically format said unformatted text data without interactive terminal input from an operator;
    the improvement including, in combination:
    first program indicia in said control memory for enabling said programmed processor to electrically indicate a number of columns to present text data on a given logical page and the depths of said columns, and indicating a shortest and longest one of said columns;
    second program indicia in said control memory for enabling said programmed processor to examine said unformatted text data formattable in said columns of said logical page and to initially select a single depth for all of said columns for said logical page, said single depth being intermediate in depth of the depths of the shortest and longest ones of said columns;

third program indicia in said control memory for enabling said programmed processor to adjust the depths of all of said columns of said logical page to said single depth by compressing the depths of said columns longer than said single depth and expanding the depths of said columns shorter than said single depth; and fourth program indicia in said second program indicia for enabling said programmed processor after initially selecting said single depth to use the depth of said shortest column for selecting a second single depth which is a minimal single column depth for containing all of said text data for said columns as a minimal column depth.

10. In a document preparation system having means for receiving unformatted text data, a programmed processor coupled to said receiving means for formatting said received unformatted text data and output means coupled to said programmed processor for receiving formatted text data for visually presenting said document, said programmed processor having a control memory storing program indicia for enabling the programmed processor to automatically format said unformatted text data without interactive terminal input from an operator;

the improvement including, in combination:

first program indicia in said control memory for enabling said programmed processor to electrically indicate a number of columns to present text data on a given logical page and the depths of said columns, and indicating a shortest and longest one of said columns;

second program indicia in said control memory for enabling said programmed processor to examine said unformatted text data formattable in said columns of said logical page and to initially select a single depth for all of said columns for said logical page, said single depth being intermediate in depth of the depths of the shortest and longest ones of said columns;

third program indicia in said control memory for enabling said programmed processor to adjust the depths of all of said columns of said logical page to said single depth by compressing the depths of said columns longer than said single depth and expanding the depths of said columns shorter than said single depth; and fourth program indicia in said third program indicia for enabling said programmed processor, while adjusting said depths of said columns to said single depth, to use a plurality of range-of-depth adjustments as respective ratios of predetermined font-related parameters of text being formatted to said columns and expressed as respective maximal permitted changes of said predetermined font-related parameters, including a first of said ratios for expansion of depth of such text being formatted and a second of said ratios for compression of depth of such text being formatted.

11. In a document preparation system having means for receiving unformatted text data, a programmed processor coupled to said receiving means for formatting said received unformatted text data and output means coupled to said programmed processor for receiving formatted text data for visually presenting said document, said programmed processor having a control memory storing program indicia for enabling the programmed processor to automatically format said unformatted text data without interactive terminal input from an operator;

the improvement including, in combination:

first program indicia in said control memory for enabling said programmed processor to electrically indicate a number of columns to present text data on a given logical page and the depths of said columns, and indicating a shortest and longest one of said columns;

second program indicia in said control memory for enabling said programmed processor to examine said unformatted text data formattable in said columns of said logical page and to initially select a single depth for all of said columns for said logical page, said single depth being intermediate in depth of the depths of the shortest and longest ones of said columns;

third program indicia in said control memory for enabling said programmed processor to adjust the depths of all of said columns of said logical page to said single depth by compressing the depths of said columns longer than said single depth and expanding the depths of said columns shorter than said single depth; and fourth program indicia in said third program indicia for enabling said programmed processor while adjusting the depths of said columns on said given logical page to examine skips, blank lines, lead outs and interline spacings as separate classes, respectively, of vertical space for vertical justification in each said column being vertically justified and to assign a priority of adjustment to each said class of vertical space such that each class is a priority class of adjustment and enabling said programmed processor to vertically adjust all areas in a given column within a given priority class of adjustment such that all areas so classified will be vertically adjusted in depth before any areas in a class of a lower priority.

12. The document preparation system set forth in claim 11 wherein said control memory further includes fifth program indicia within said sixth program indicia for enabling said programmed processor to include all areas of text relating to a shift textual informational content in a highest priority class of adjustment, to include all areas of text relating to separation of sets of plural lines of text in a second highest priority class of adjustment and to include all other text in a third highest priority class of adjustment.

* * * * *